(12) United States Patent
Chou

(10) Patent No.: US 8,171,888 B2
(45) Date of Patent: May 8, 2012

(54) ENHANCED PET CARRIER

(75) Inventor: David K. Y. Chou, Hayward, CA (US)

(73) Assignee: Yuntek International, Inc., Hayward, CA (US)

(*) Notice: Subject to any disclaimer, the term of this patent is extended or adjusted under 35 U.S.C. 154(b) by 130 days.

(21) Appl. No.: 12/707,579

(22) Filed: Feb. 17, 2010

(65) Prior Publication Data

US 2011/0197822 A1 Aug. 18, 2011

(51) Int. Cl.
*A01K 1/03* (2006.01)
(52) U.S. Cl. .......................................... 119/497; 119/498
(58) Field of Classification Search .......... 119/496–499, 119/482, 453, 474, 28.5; 135/95, 117; 224/154
See application file for complete search history.

(56) References Cited

U.S. PATENT DOCUMENTS

| | | | |
|---|---|---|---|
| 611,753 A | 10/1898 | Hoskins | |
| 1,443,901 A | 1/1923 | Murray | |
| 2,121,658 A | 6/1938 | Gehret | |
| 2,170,379 A | 8/1939 | Ortt | |
| 2,254,578 A | 9/1941 | O'Brien | |
| 2,516,869 A | 8/1950 | Harris | |
| 2,538,778 A | 1/1951 | Halpin | |
| 2,585,745 A * | 2/1952 | Crosby | 190/111 |
| 2,987,043 A | 6/1961 | Spindler | |
| 3,048,147 A | 8/1962 | McKean | |
| 3,611,994 A | 10/1971 | Bailey et al. | |
| 3,675,667 A | 7/1972 | Miller | |
| 4,397,398 A | 8/1983 | Watanabe | |
| 4,665,935 A | 5/1987 | Nichols | |
| 4,796,734 A * | 1/1989 | Distasio | 190/1 |
| 4,895,230 A | 1/1990 | King | |
| 4,909,188 A | 3/1990 | Tominaga | |
| 4,977,857 A | 12/1990 | Slawinski | |
| 4,997,021 A * | 3/1991 | Brutsaert | 160/22 |
| 5,016,570 A | 5/1991 | Henson | |
| 5,072,694 A | 12/1991 | Haynes et al. | |
| 5,078,096 A | 1/1992 | Bishop et al. | |
| 5,332,093 A * | 7/1994 | Littlepage | 206/457 |
| 5,881,678 A | 3/1999 | Morley | |
| 5,931,120 A | 8/1999 | Burns et al. | |
| 6,021,740 A | 2/2000 | Martz | |
| 6,076,485 A * | 6/2000 | Peeples et al. | 119/497 |
| 6,082,305 A | 7/2000 | Burns et al. | |
| 6,109,281 A | 8/2000 | Lowenthal | |
| 6,131,534 A | 10/2000 | Axelrod | |
| 6,155,206 A | 12/2000 | Godshaw | |
| 6,209,557 B1 | 4/2001 | Zheng | |
| 6,257,263 B1 | 7/2001 | Brereton | |
| 6,276,501 B1 * | 8/2001 | Tong | 190/107 |

(Continued)

FOREIGN PATENT DOCUMENTS

GB 2029204 A 3/1980

(Continued)

*Primary Examiner* — Kristen C Hayes
(74) *Attorney, Agent, or Firm* — Fliesler Meyer LLP

(57) ABSTRACT

A detachable pet carrier for housing a pet that allows the pet to rest on one or more of its interior surfaces. The pet carrier may include a roof that provides shelter for the rest area in the pet carrier's deployed configuration. The pet carrier may also include one or more bolsters on one or more of its interior surfaces to better define the boundaries of the rest area in the pet carrier's deployed configuration. The pet carrier may also include one or more pockets on its interior and or exterior surfaces.

14 Claims, 23 Drawing Sheets

U.S. PATENT DOCUMENTS

| | | |
|---|---|---|
| 6,286,461 B1 | 9/2001 | Martz |
| 6,286,462 B1 | 9/2001 | Burns |
| 6,289,910 B1 | 9/2001 | Zhang |
| 6,334,519 B1 | 1/2002 | Tong |
| 6,363,955 B1 | 4/2002 | Louie |
| 6,443,274 B1 | 9/2002 | Klamm |
| 6,446,577 B1 | 9/2002 | Salahor |
| 6,715,446 B2 | 4/2004 | Chou |
| 6,848,460 B2 * | 2/2005 | Zheng ................... 135/126 |
| 7,040,486 B2 * | 5/2006 | Godshaw et al. ............ 206/581 |
| D621,101 S * | 8/2010 | Hu ............................... D30/109 |
| 2008/0072837 A1 * | 3/2008 | Redzisz et al. ............... 119/474 |
| 2009/0205578 A1 * | 8/2009 | Alves ............................ 119/454 |
| 2010/0175633 A1 * | 7/2010 | Krauss et al. ................ 119/497 |
| 2011/0056441 A1 * | 3/2011 | Chang .......................... 119/453 |

FOREIGN PATENT DOCUMENTS

| | | |
|---|---|---|
| WO | 94/18822 | 9/1994 |

* cited by examiner

ENHANCED PET CARRIER

FIELD OF THE INVENTION

The subject matter described herein relates to the construction of an expandable pet carrier.

BACKGROUND

Over the years, many different types of pet carriers (e.g., cages, containers, and bags) have been employed by pet owners to transfer their pets. While these traditional pet carriers are capable of effectively transferring pets from one location to another, but they typically do so in a manner that is uncomfortable for the pets. Accordingly, what is needed is an enhanced pet carrier that accommodates the needs of both pet owners and pets alike.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention. In the drawings.

DETAILED DESCRIPTION

Embodiments are described herein in the context of an enhanced pet carrier. Those of ordinary skill in the art will realize that the following detailed description is illustrative only and is not intended to be in any way limiting. Other embodiments of the present invention will readily suggest themselves to such skilled persons having the benefit of this disclosure. Reference will now be made in detail to implementations of embodiment of the present invention as illustrated in the accompanying drawings. The same reference indicators will be used throughout the drawings and the following detailed description to refer to the same or like parts.

Pet Carrier—Undeployed Configuration

Figure 1:
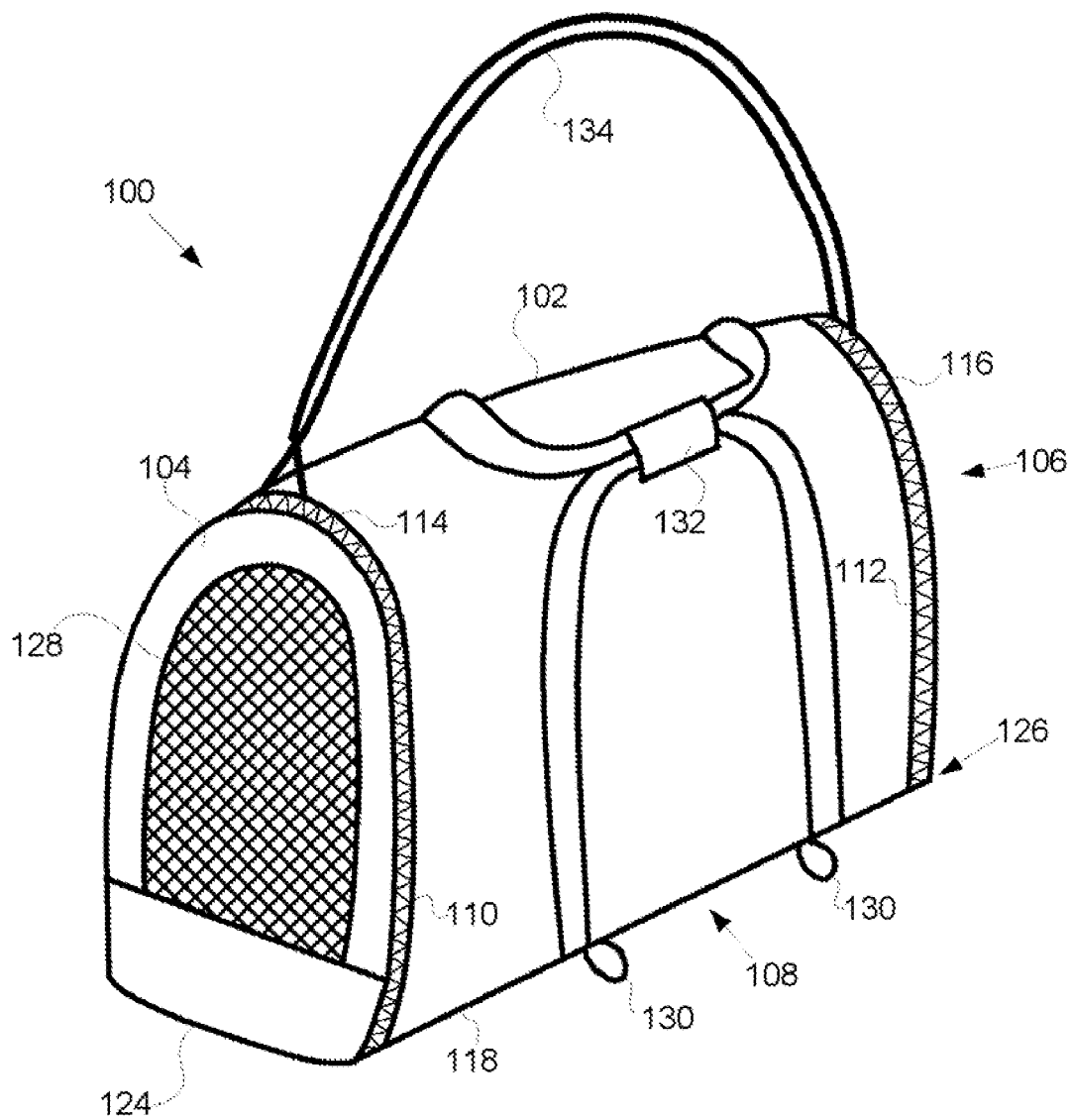
FIG. 1 illustrates a top perspective view of a pet carrier in accordance with an embodiment of the present invention.
Figure 2:
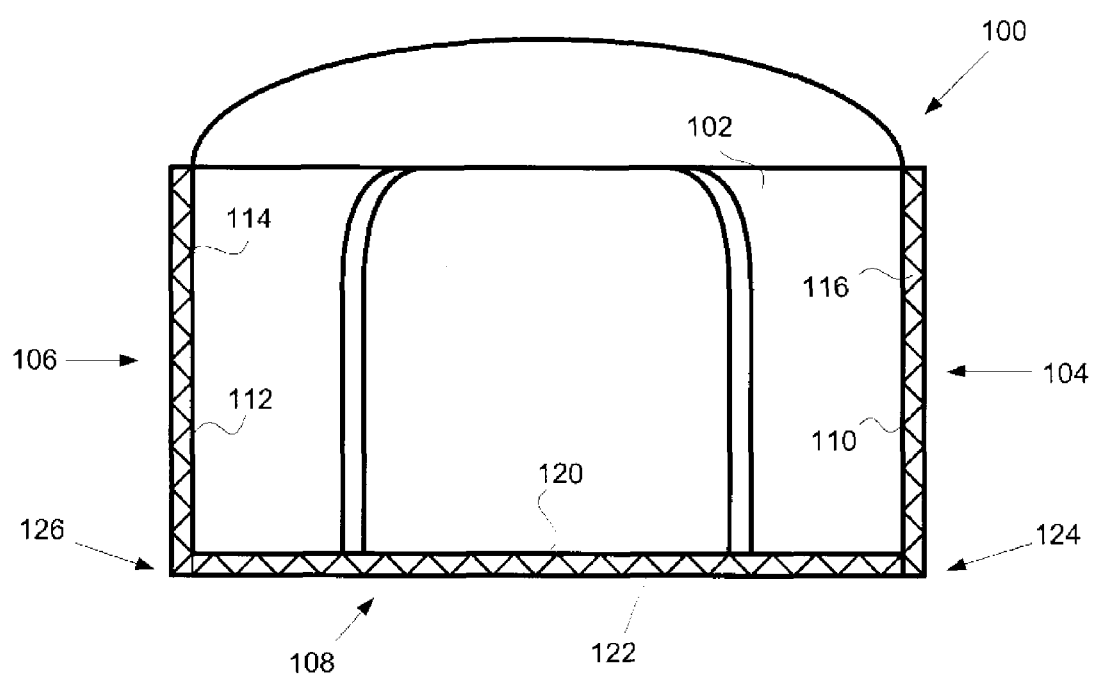
FIG. 2 illustrates a side view of a pet carrier in accordance with an embodiment of the present invention.

FIGS. 1 and 2 illustrate pet carrier 100 in its undeployed configuration in accordance with an embodiment of the present invention. Specifically, FIG. 1 illustrates a top perspective view of pet carrier 100, while FIG. 2 illustrates a side view of pet carrier 100. FIG. 2 illustrates the side of pet carrier 100 that is not visible in FIG. 1.

Referring now to FIG. 1, pet carrier 100 can be seen as being a housing formed from top cover 102, which forms the top and side walls of pet carrier 100, front panel 104, back panel 106, and base 108 (generally referred to but not shown). In this embodiment, top cover 102 is connected to front panel 104 and back panel 106 along its front and back edges 110, 112. In an embodiment, top cover 102 can be connected to front panel 104 and back panel 106 using one or more attaching mechanisms. As used throughout this application, attaching mechanisms are defined to include, but are not limited to, buttons, fasteners, clips, zippers, hook-and-loop attachments, and Velcro®. In this embodiment, zippers 114, 116 have been employed in accordance with the preferred embodiment of the invention. It is noted that zippers 114, 116 can function to provide structure to the soft sides of the pet carrier 100.

In an embodiment, side edge 118 of top cover 102 is permanently attached to (e.g., sewn to) base 108 (as shown in FIG. 1) while the side edge 120 of top cover 102 is detachably connected to base 108 (as shown in FIG. 2). In an embodiment, side edge 120 of top cover 102 can be connected to base 108 using one of more attaching mechanisms. In the embodiment illustrated in FIG. 2, zipper 122 is used to connect side edge 120 of top cover 102 to bottom surface 108. In an embodiment, bottom edge 124 of front panel 104 and bottom edge 126 of back panel 106 are permanently attached to (e.g., sewn to) base 108 as shown in FIG. 1.

Figure 3:
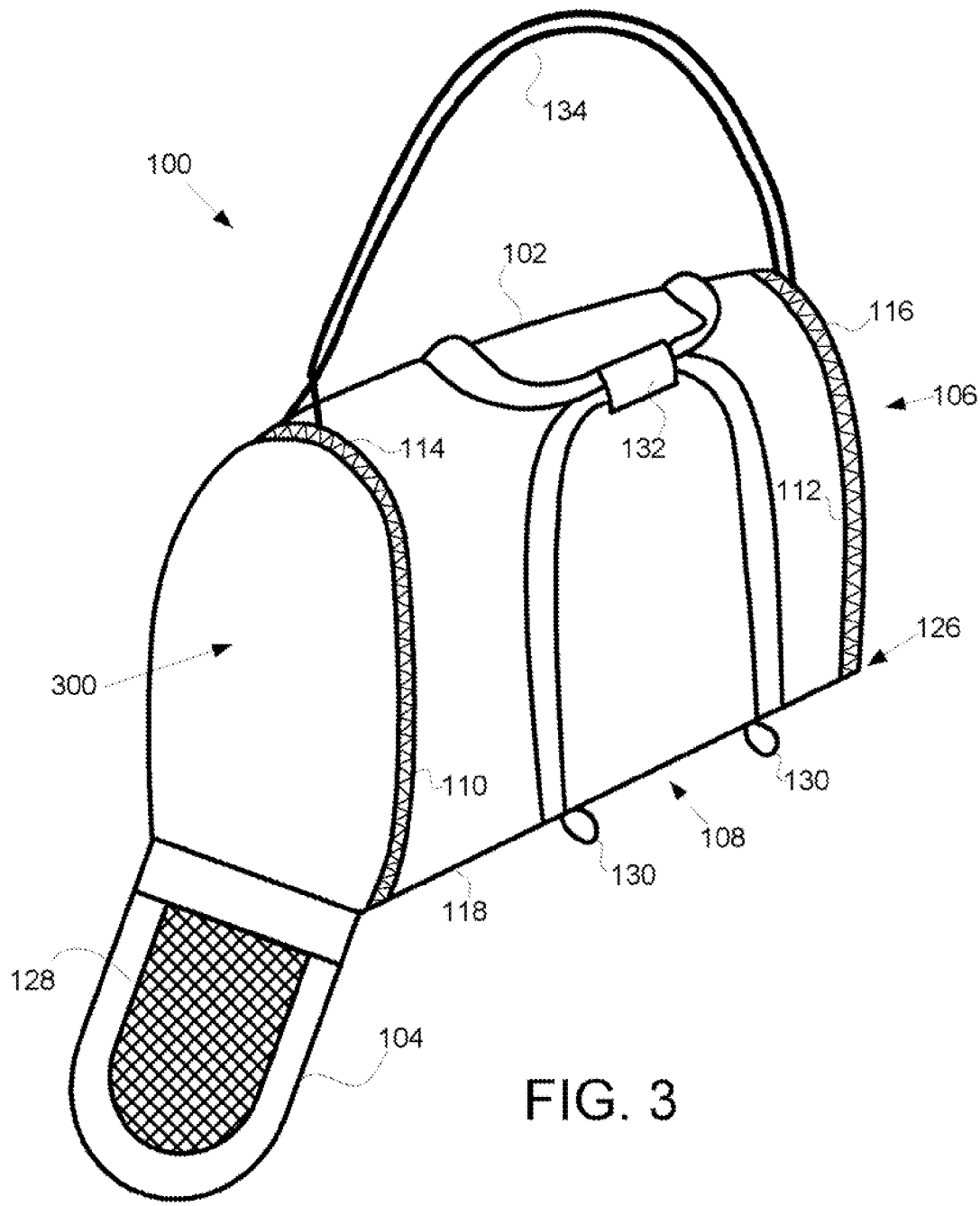
FIG. 3 illustrates a top perspective view of a pet carrier with its door in the open configuration in accordance with an embodiment of the present invention.

In an embodiment, front panel 104 and/or back panel 106 can act as doors for pet carrier 100. Accordingly, front panel 104 can detached from top cover 102 to create opening 300, as shown in FIG. 3, which allows pets ingress and egress to the interior of pet carrier 100. Back panel 106 can also be detached from top cover 102 in substantially the same manner.

The exterior surfaces of pet carrier 100 are preferably made from a light-weight, flexible material. Accordingly, the material used for the exterior surfaces of pet carrier 100 should also permit collapsing, rolling, and folding of top cover 102, front panel 104, and back panel 106. In an embodiment, the exterior surfaces of pet carrier 100 are made of nylon or canvas material. In another embodiment, the material used for the exterior surfaces are water-proof.

In an embodiment, base 108 can include, and be reinforced by, a substantially rigid material including, but not limited to, plastic, polyethylene, polypropylene, and vinyl chloride. The rigid material on base 108 can help pet carrier 100 maintain its structure while carrying a pet therein.

In an embodiment of the invention, front panel 104 and/or back panel 106 can have a window that enables air to pass into pet carrier 100 in order to ventilate the interior of pet carrier 100. Referring back to FIG. 1, front panel 104 can be seen as having transparent mesh window 128.

In an embodiment of the invention, loops 130 are provided along base 108 to accommodate hardware, such as stakes. When in use, pet carrier 100 can be secured or anchored to the ground by placing suitable stakes, such as those already known in the art, through the loops and into the ground.

In an embodiment, one or more handles and/or straps can be attached to pet carrier 100 to enable it to be picked up and moved easily. For example, FIG. 1 illustrates pet carrier 100 as having handle 132 and shoulder strap 134.

Pet Carrier—Deployed Configuration

Figure 4:
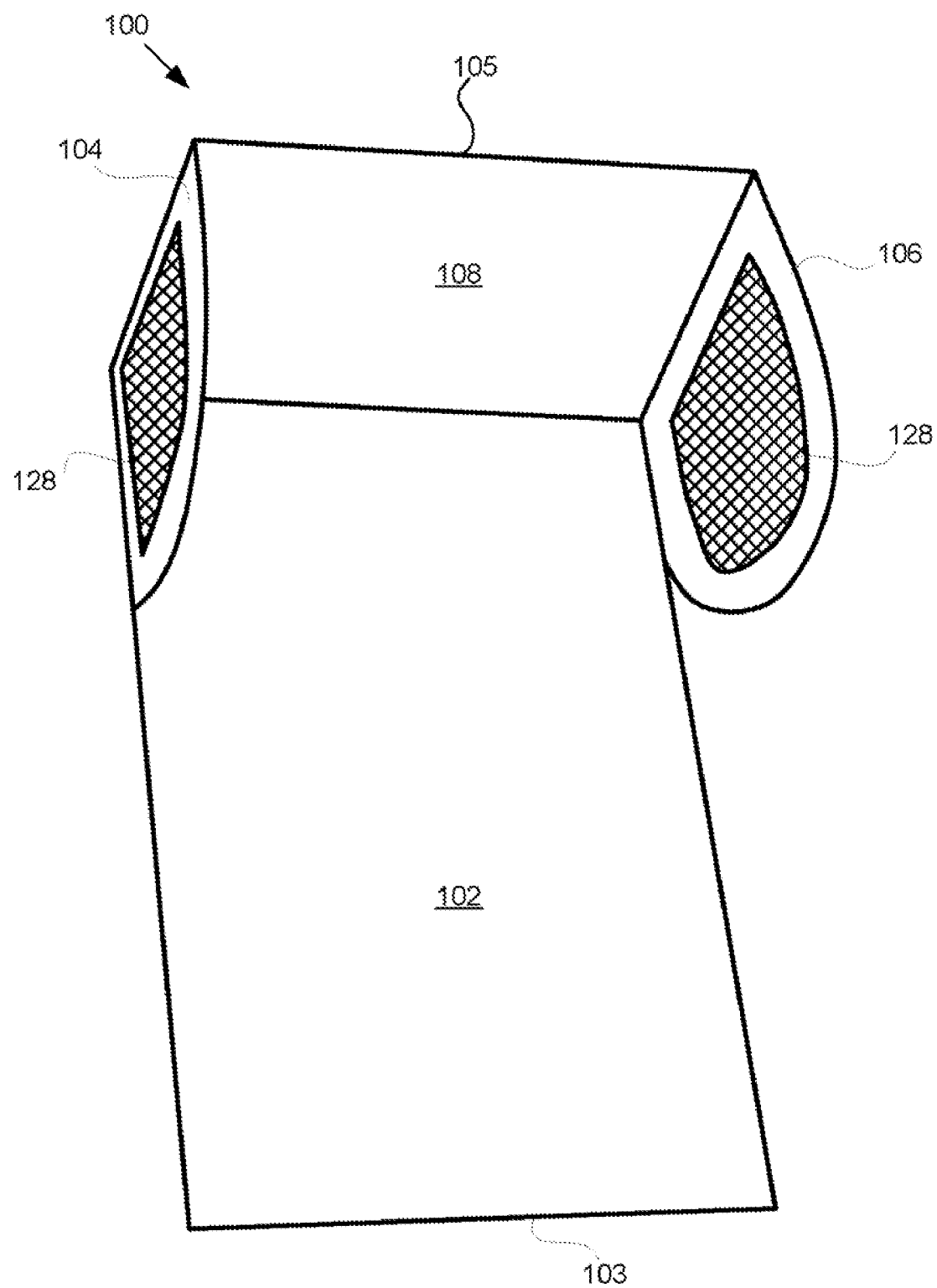
FIG. 4 illustrates a top perspective view of a pet carrier in one of its deployed configurations in accordance with an embodiment of the present invention.
Figure 5:
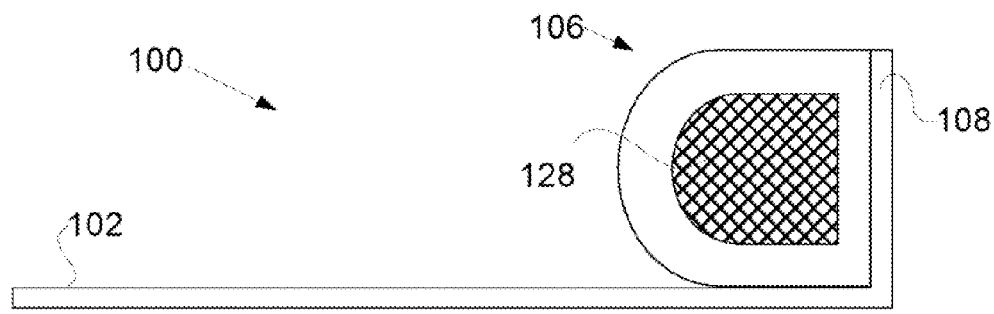
FIG. 5 illustrates a side view of a pet carrier in one of its deployed configuration in accordance with an embodiment of the present invention.

Once the pet has been transferred to the desired location, pet carrier 100 can be deployed to allow the pet to rest comfortably on its interior surface. FIGS. 4 and 5 illustrate pet carrier 100 in one of its deployed configurations in accordance with an embodiment of the present invention. Specifically, FIG. 4 illustrates a top perspective view of pet carrier 100 in one of its deployed configurations, and FIG. 5 illustrates a side view of pet carrier 100 in the same deployed configuration.

Figure 6:
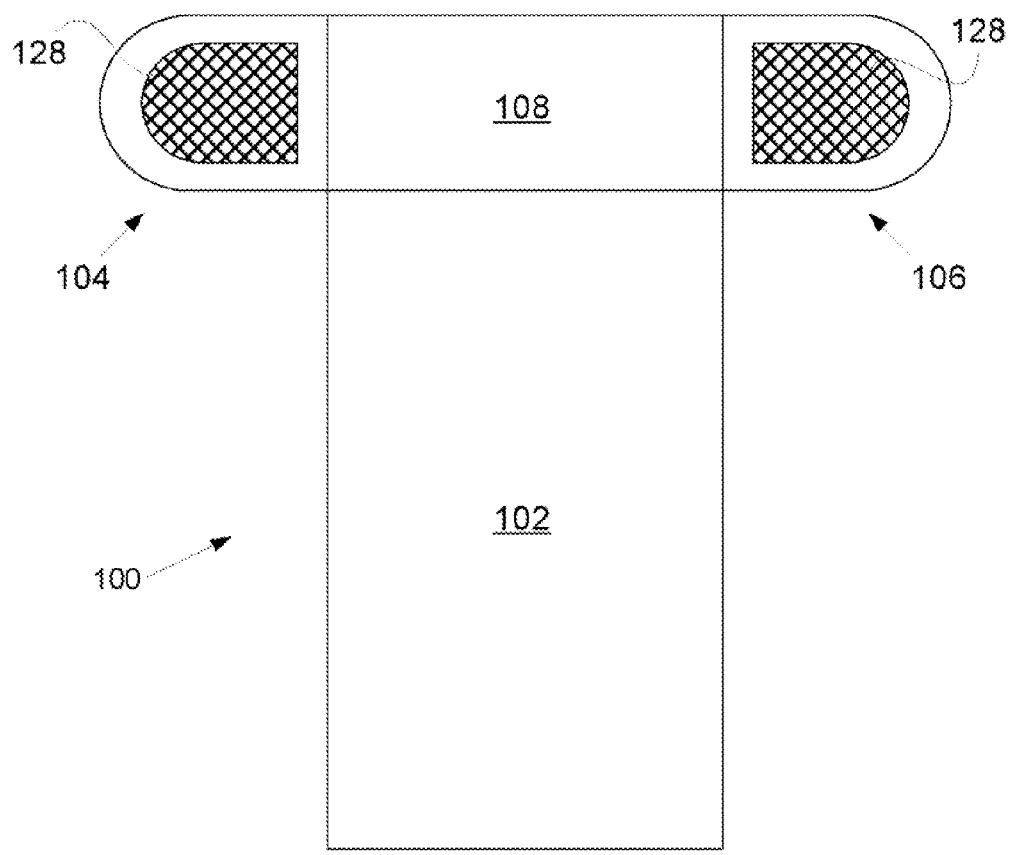
FIG. 6 illustrates a top view of a pet carrier in its fully deployed configuration in accordance with an embodiment of the present invention.

In an embodiment, top cover 102 can be detached from front panel 104, back panel 106, and one side of base 108 in order to allow top cover 102 to lie flat against the ground. This configuration allows the pet to rest comfortably on the interior surface of top cover 102 while the exterior surface of top cover 102 is placed proximal to the ground. In the embodiment illustrated in FIG. 4, top cover 102 has only partially been detached from front panel 104 and back panel 106. This configuration allows base 108, front panel 104 and back panel 106 to extend substantially perpendicular to top cover 102 (and thus the ground) in order to provide three walls against which a pet can lean against and rest and which can give the pet shelter. In another embodiment, top cover 102 can be completely detached from front panel 104 and back panel 106 as shown in FIG. 6. In this configuration, top cover 102, base 108, front panel 104 and back panel 106 can all lie substantially flat against the ground.

In an embodiment, at least one of the interior surfaces of pet carrier 100 incorporates padding material (e.g., foam, carpeting) into its design. In another embodiment, at least one of the interior surfaces of pet carrier 100 includes a water-resistant coating. In yet another embodiment, pet carrier 100 includes interior surfaces having deodorizers and disinfectants incorporated into them.

Roof or Canopy

In certain embodiments of the invention, pet carrier 100 includes a roof (i.e., a canopy or tent) that extends over a portion of top cover 102 of pet carrier 100 to provide shading for the pets.

Figure 7:
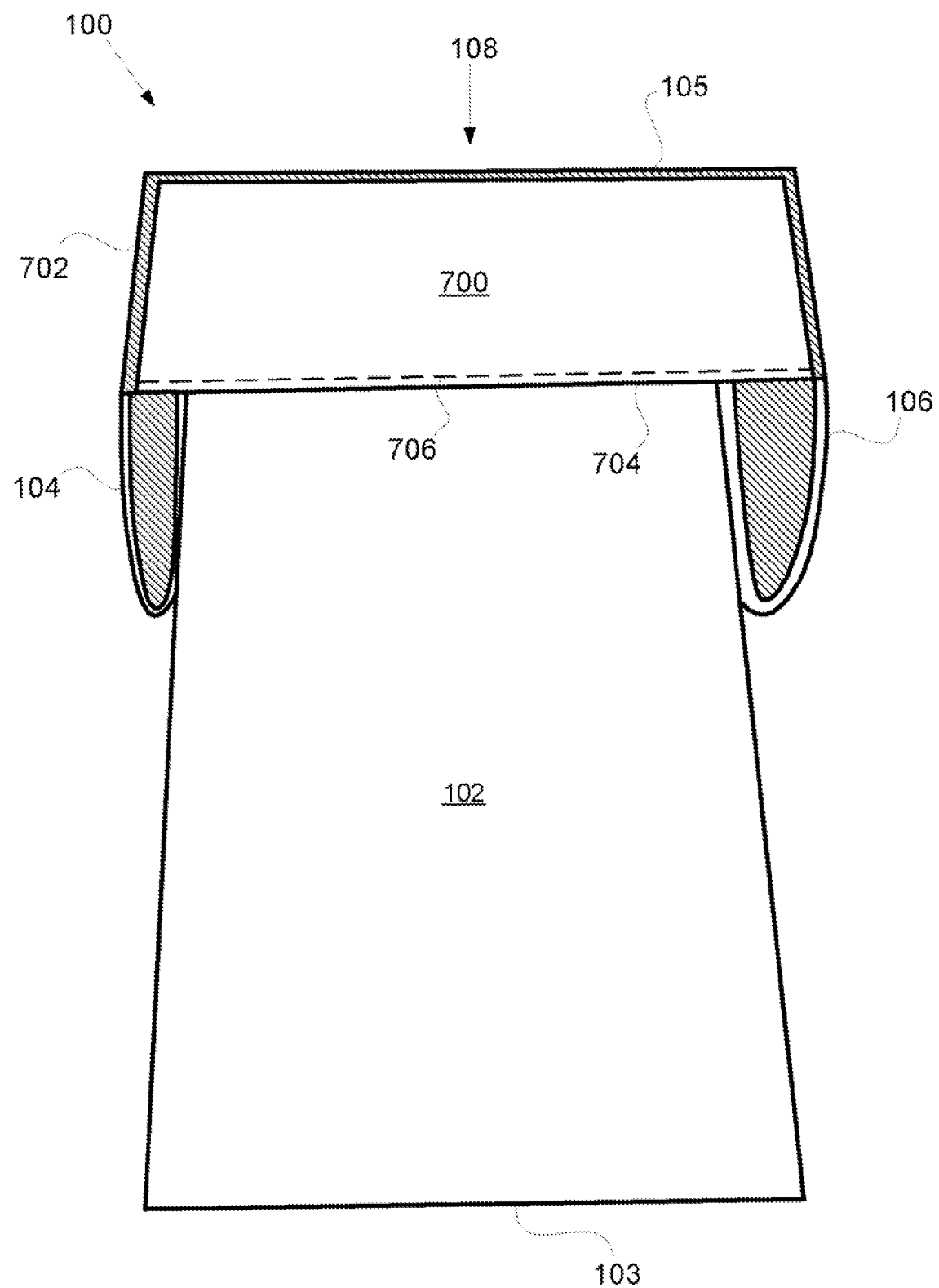
FIG. 7 illustrates a top perspective view of a pet carrier having a roof in accordance with an embodiment of the present invention.

Referring now to FIG. 7, an embodiment of pet carrier 100 including roof 700 is shown. In an embodiment, roof 700 can be detachably connected to pet carrier 100 along a portion of base 108, front panel 104 and back panel 106 as shown in FIG. 7. Roof 700 can be connected to pet carrier 100 using one or more attachment mechanisms. In FIG. 7, roof 700 is illustrated as being attached to pet carrier 100 using zipper 702. In this manner, roof 700 can easily be attached to and detached from pet carrier 100 as desired by the pet owner. In this embodiment top cover 102 can be deployed over the roof 700, wherein edge 103 of top cover 102 is fastened to edge 105 of base 108 when pet carrier 100 is in its undeployed configuration as shown in FIG. 1.

In another embodiment, roof 700 is permanently connected to (e.g., sewn into) pet carrier 100 along corresponding edges of base 108, front panel 104, and back panel 106. Consequently, in this embodiment, transitioning pet carrier 100 from its undeployed configuration to its deployed configuration will automatically expose roof 700 as show in FIG. 7 (excluding zipper 702).

Additionally in this embodiment, a flexible wire 706 can be provided at the edge 704 of the roof or tent cover 700. This flexible wire 706 can be used to support the edge 704 of roof 700. It is to be understood that the wire 706 can also have other shapes as can the edge 704 of the roof. By way of example only, the wire 706 can be U-shaped so that the roof projects further out over the top cover 102 in the pet carrier's deployed configuration. Also, the wire 706 can be U-shaped and project upward in order to make roof 700 barrel-shaped. Further, the wire 706 can both project up and out over the deployed top cover 102 much as an awning could project over a window or doorway. It is to be understood that the roof could be reshaped or have additional material to accommodate the various shapes of the supporting wire 706.

Figure 8A:
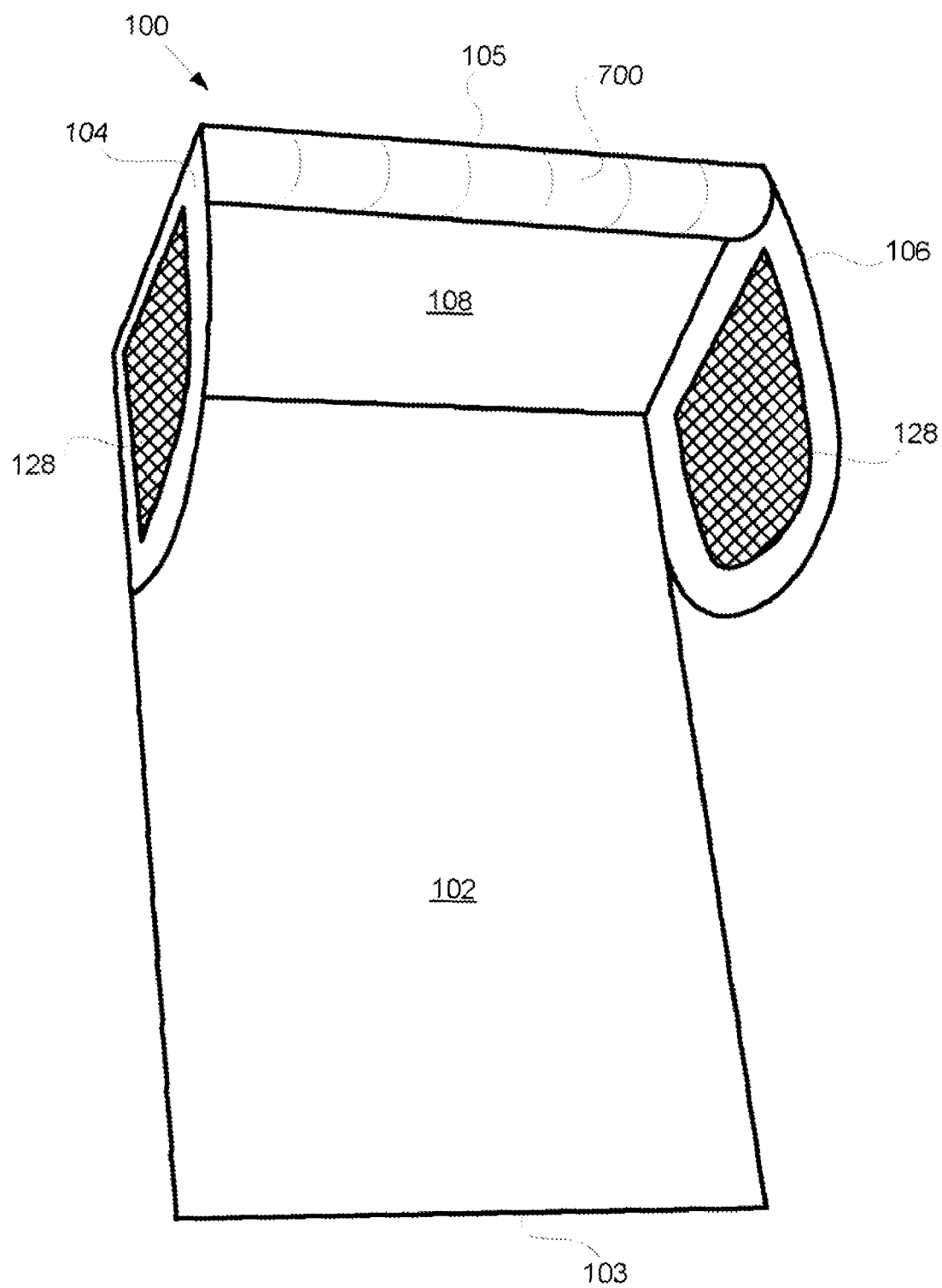
FIG. 8A illustrates a top perspective view of a pet carrier having a roof wherein the roof has been rolled up in accordance with an embodiment of the present invention.

In yet another embodiment, roof 700 can be permanently attached to base 108 and detachably connected to front panel 104 and back panel 106 using one or more attaching mechanisms. In other words, roof 700 is permanently connected to a single interior edge of base 108 within pet carrier 100. When pet carrier 100 is constructed in this manner, roof 700 can be rolled up and stored adjacent to base 108 as shown in FIG. 8A.

Figure 8B:
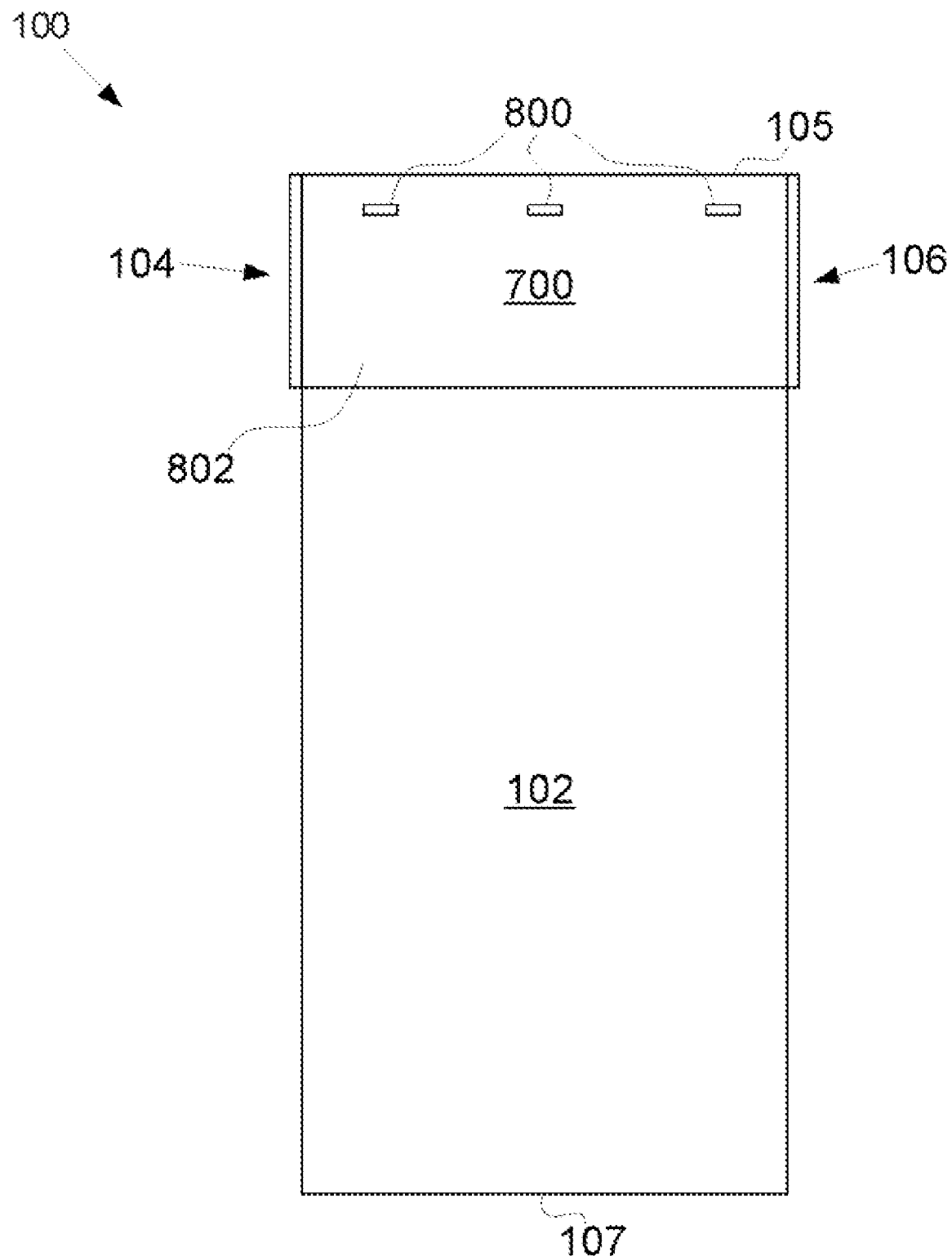
FIG. 8B illustrates a top view of a pet carrier having a roof, consistent with the pet carrier illustrated in FIG. 8A, wherein the roof is in its open configuration in accordance with an embodiment of the present invention.

In an embodiment, the roof 700 can be stored within pet carrier 100 by detachably connecting the rolled roof 700 to base 108 using one or more attaching mechanisms. For example, in FIG. 8B, Velcro® 800 has been sewn onto the top surface 802 of roof 700 and also to the inner surface of base 108 (not shown). In this configuration, when roof 700 is rolled up inside pet carrier 100, it can be held in place by Velcro® 800 alongside base 108. In this embodiment top cover 102 can be deployed over the roof 700, wherein edge 103 of top cover 102 is fastened to edge 105 of base 108 when pet carrier 100 is in its undeployed configuration as shown in FIG. 1.

In alternative embodiments of the invention, roof 700 includes an extendable frame that defines the perimeter of roof 700. The extendable frame can be used to allow roof 700 to extend past front panel 104 and back panel 106 to provide additional shading to pets.

Figure 9A:
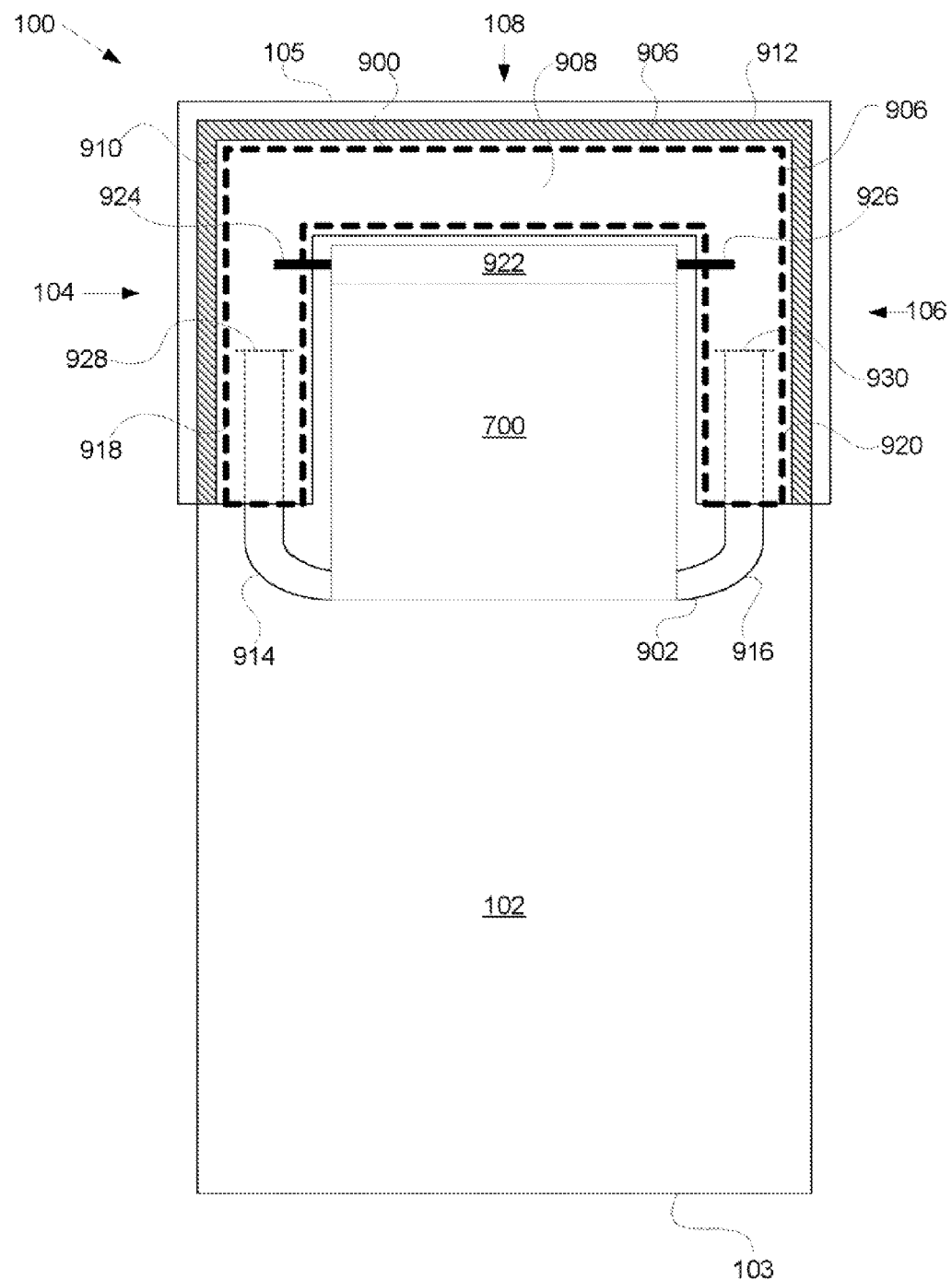
FIG. 9A illustrates a top view of a pet carrier having an extendable roof in accordance with an embodiment of the present invention.
Figure 9B:
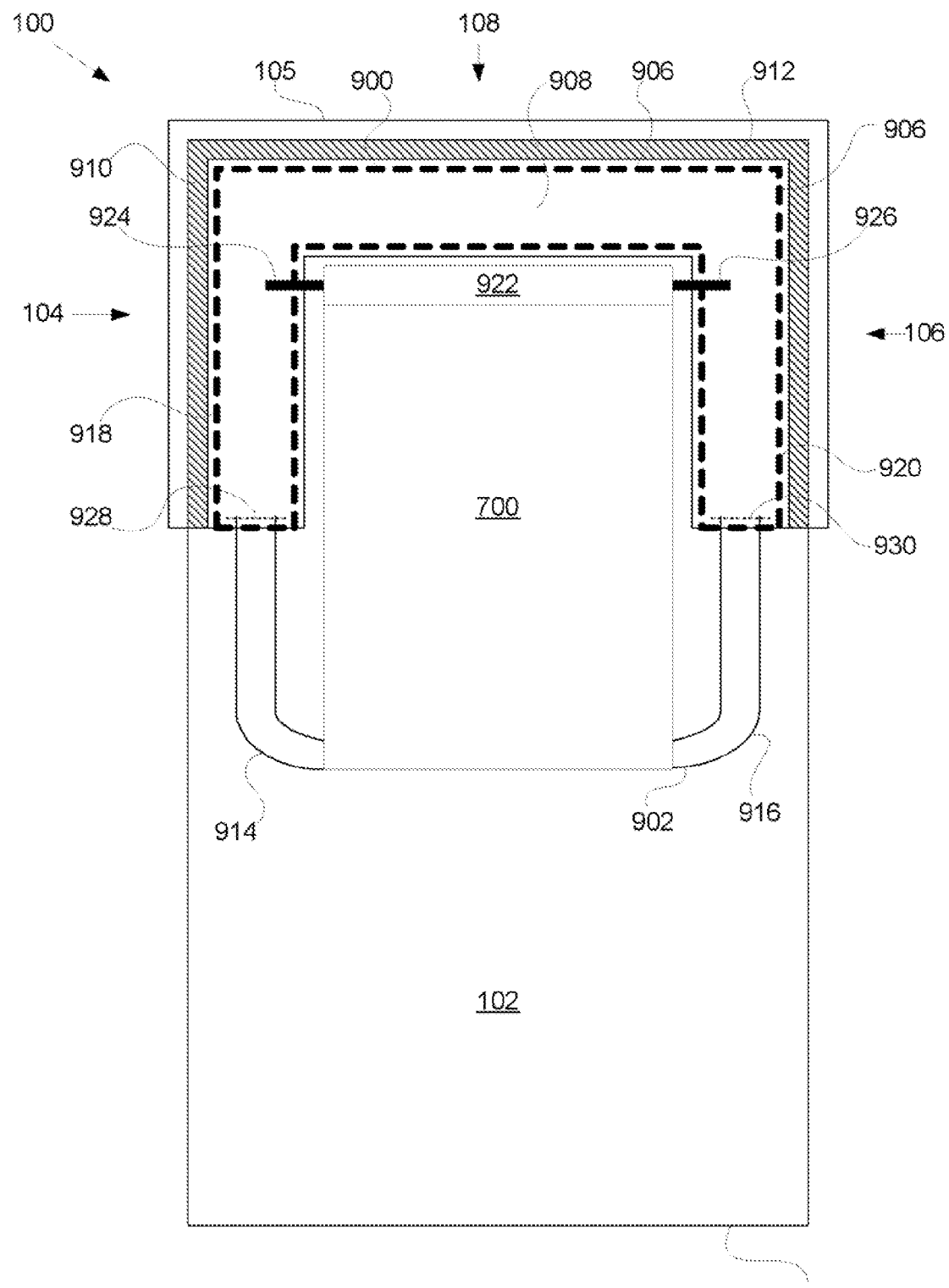
FIG. 9B illustrates a top view of a pet carrier having an extendable roof, consistent with the pet carrier illustrated in FIG. 9A, wherein the roof is in its extended configuration in accordance with an embodiment of the present invention.

One embodiment of roof 700 including an extendable frame is illustrated in FIGS. 9A and 9B. Referring first to FIG. 9A, pet carrier 100 can be seen as including roof 700 having outer frame 900, pull-out bar 902 and roller 904. Outer frame 900 can further be seen as including U-shaped casing 906 having an internal bore 908. In this embodiment, the U-shaped casing 906 is positioned within fabric sleeve 910, wherein fabric sleeve 910 substantially surrounds the perimeter of U-shaped casing 906. Fabric sleeve 910 allows U-shaped casing 906 to be easily attached to pet carrier 100.

In an embodiment, fabric sleeve 910 can be permanently sewn into the inner surfaces of front panel 104, back panel 106 and bottom surface 108 of pet carrier 100. In another embodiment, fabric sleeve 910 is detachably connected to the inner surfaces of front panel 104, back panel 106 and bottom surface 108 of pet carrier 100 using one or more attaching mechanisms. For example, in FIG. 9A, fabric sleeve 910 has been connected to pet carrier 100 using zipper 912.

Pull-out bar 902 is a U-shaped bar having arms 914, 916, which are inserted into and mated with arms 918, 920 of outer frame 900 within internal bore 908 of U-shaped casing 906. In this manner, pull-out bar 902 and outer frame 900 are slidably attached to one other. Embodiments of outer frame 900 and pull-out bar 902 can have any shape including, but not limited to, tubular and rectangular shapes. Embodiments of outer frame 900 and pull-out bar can also be made of any light, rigid material including, but not limited to, plastic and aluminum.

Pull-out bar 902 can also be seen as being attached to roof 700 along its front edge. Thus, roof 700 is attached to pull-out bar 902 on one end, and wrapped around roller 922 on its other end. Put another way, outer frame 900 is connected to a pull-out bar 902 and roller 922 on substantially opposing sides of outer frame 900. Roller 922 can be attached to outer frame 900 using rods 924, 926, which in this embodiment extend into U-shaped case 906.

In use, material used for roof 700 can be expanded (and thus exposed) to cover a greater area over top cover 102 by pulling on pull-out bar 902 away from bottom surface 108. In an embodiment, ends 928, 930 of pull-out bar 902 are wider than the openings through which arms 914, 916 enter into outer frame 900, thereby preventing overextension of pull-out bar 902 and/or roof 700. In this embodiment top cover 102 can be deployed over the roof 700, wherein edge 103 of top cover 102 is fastened to edge 105 of base 108 when pet carrier 100 is in its undeployed configuration as shown in FIG. 1.

FIG. 9B illustrates roof 700 in its fully extended configuration. After the roof has been used, pull-out bar 902 can be pushed back into outer frame 900 as roof 700 is rewrapped around roller 922. In an embodiment, roof 700 can be rewrapped around roller 922 manually. In another embodiment, roller 922 can be automatically rewrapped around roller 922 as pull-out bar 902 is pushed back into outer frame 900. In this embodiment, a ratchet and pawl mechanism which is governed by a spring coil inside roller 922 can be used. This type of mechanism is commonly used to automatically rewrap window shades.

Figure 10A:
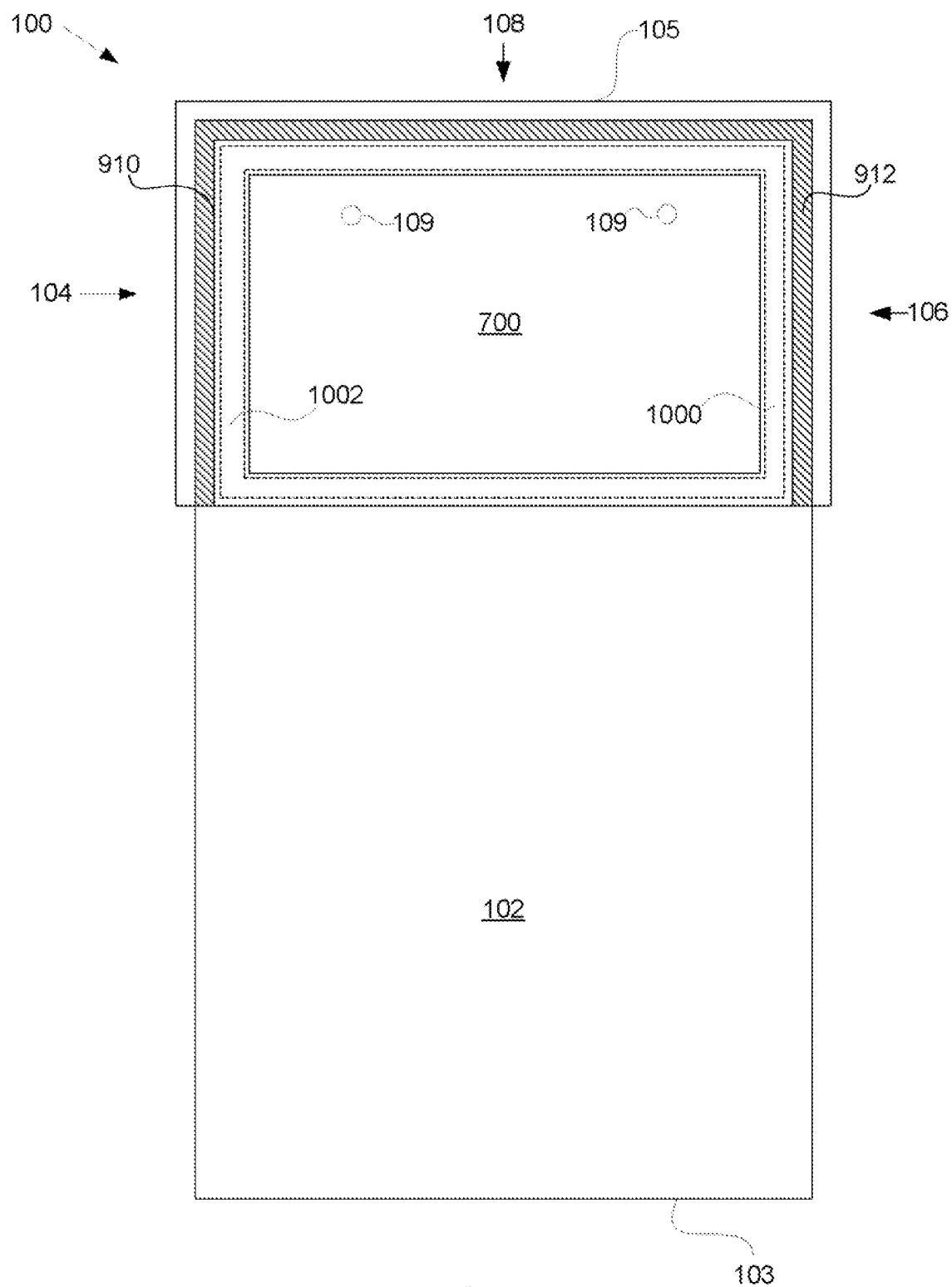
FIG. 10A illustrates a top view of a pet carrier having an extendable roof in accordance with an embodiment of the present invention.
Figure 10B:
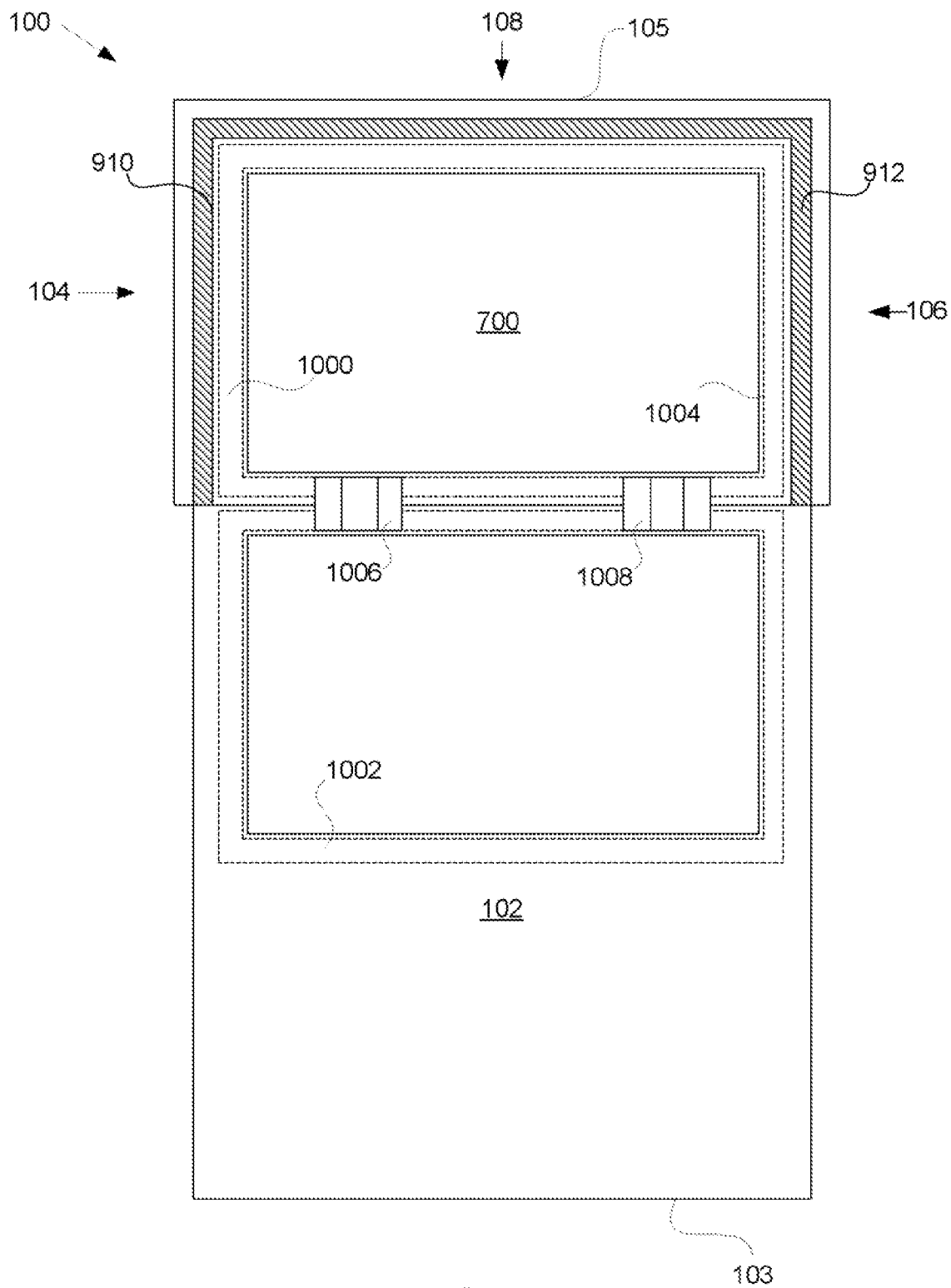
FIG. 10B illustrates a top view of a pet carrier having an extendable roof, consistent with the pet carrier illustrated in FIG. 10A, wherein the roof is in its extended configuration in accordance with an embodiment of the present invention.

An alternative embodiment of roof 700 also including an extendable frame is illustrated in FIGS. 10A and 10B. In this embodiment, frame 1000 includes two or more sections 1002, 1004 that can be folded over one another in the frame's 1000 undeployed configuration (as shown in FIG. 10A), and then unfolded in the frame's 1000 deployed configuration (as shown in FIG. 10B). In this embodiment, sections 1002 and 1004 can pivot about hinges 1006, 1008 (e.g., spring biased hinges, spring wire), which are attached to the inner surfaces of sections 1002, 1004. In an embodiment, hinges 1006, 1008 bias section 1004 to the deployed position shown in FIG. 10B. In the undeployed position, section 1002 overlaps section 1004 (FIG. 10A) and can be held in place by fasteners including snap 109 or any other attaching mechanism.

In an embodiment, frame 1000 can be attached to pet carrier 100 as described above for outer frame 900 using a fabric sleeve 910 and a zipper 912. In an embodiment, frame 1000 can be made of any light, rigid material including, but not limited to, plastic and aluminum. In this embodiment top cover 102 can be deployed over the roof 700, wherein edge 103 of top cover 102 is connected to edge 105 of base 108 when pet carrier 100 is in its undeployed configuration as shown in FIG. 1. In an embodiment, frame 1000 may include more than two sections.

In certain embodiments, roof 700 can be made of any soft, flexible fabric, such as, nylon, polyester, cotton and other suitable fabrics. In other embodiments, roof 700 can be made of a material that is more rigid including, but not limited to, any plastic or suitable polymer. It is to be understood that other embodiments of roof 700 can be employed by those having ordinary skill in the art and still fall within the scope of this invention.

Bolsters

In an embodiment of the present invention, pet carrier 100 includes one or more rails or bolsters around the perimeter of its inner surfaces. FIGS. 11A-11D illustrate top views of pet carrier 100 in its fully deployed configuration having different bolster configurations for pet carrier 100.

Figure 11A:
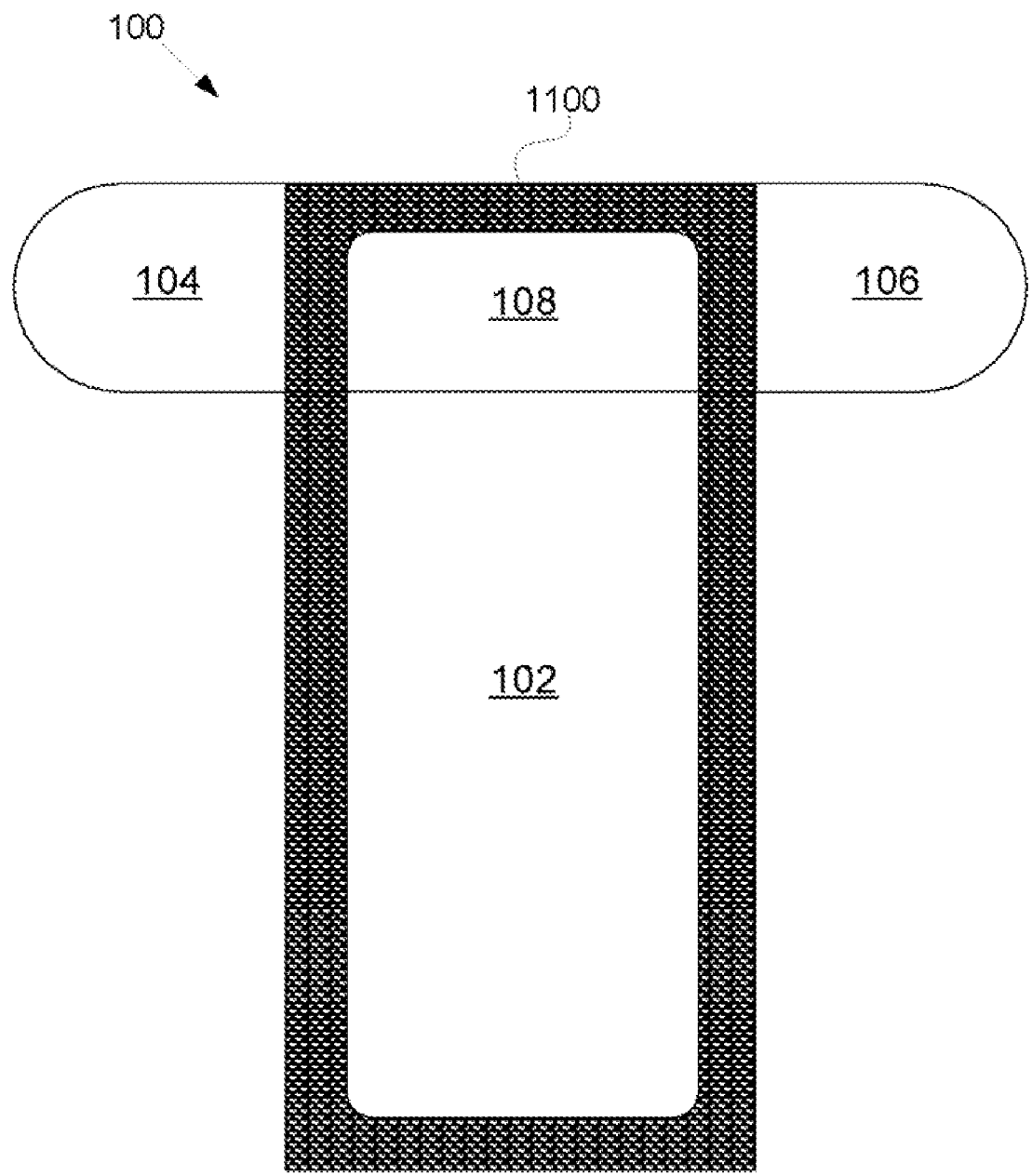
FIG. 11A illustrates a top view of a pet carrier having a bolster in accordance with an embodiment of the present invention.

Referring now to FIG. 11A, this embodiment of pet carrier 100 can be seen as including bolster 1100 around the combined perimeter of the inner surface of top cover 102 and base 108. In an embodiment, bolster 1100 is a cushioned tubular rail that extends away from the inner surface of pet carrier 100. In this configuration, bolster 1100 can be used to better define the boundaries of the area that the pet is allowed to move and rest within pet carrier 100 in its deployed configuration. Pets may also rest against bolster 1100.

Figure 11B:
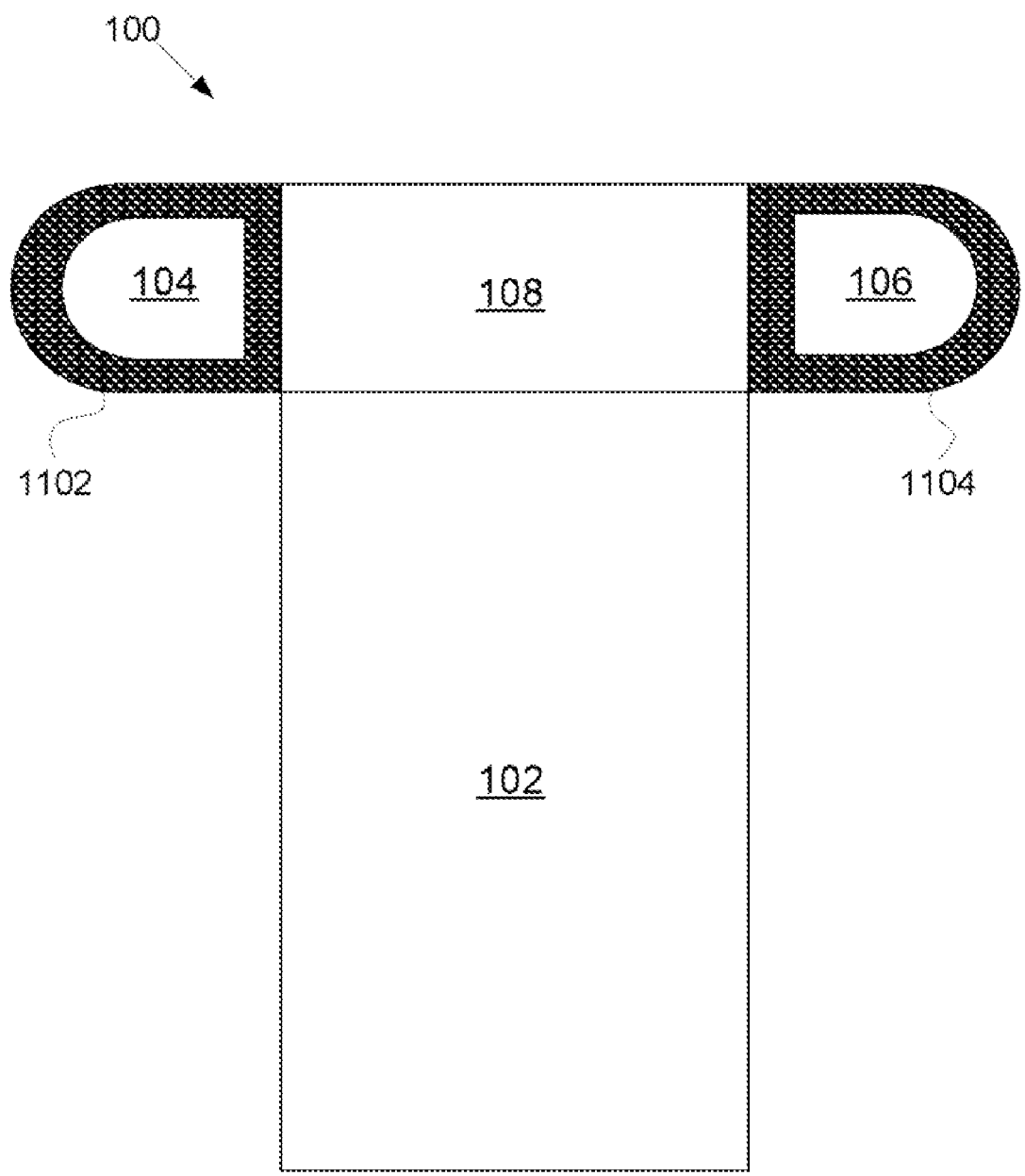
FIG. 11B illustrates a top view of a pet carrier having a bolster in accordance with an embodiment of the present invention.
Figure 11C:
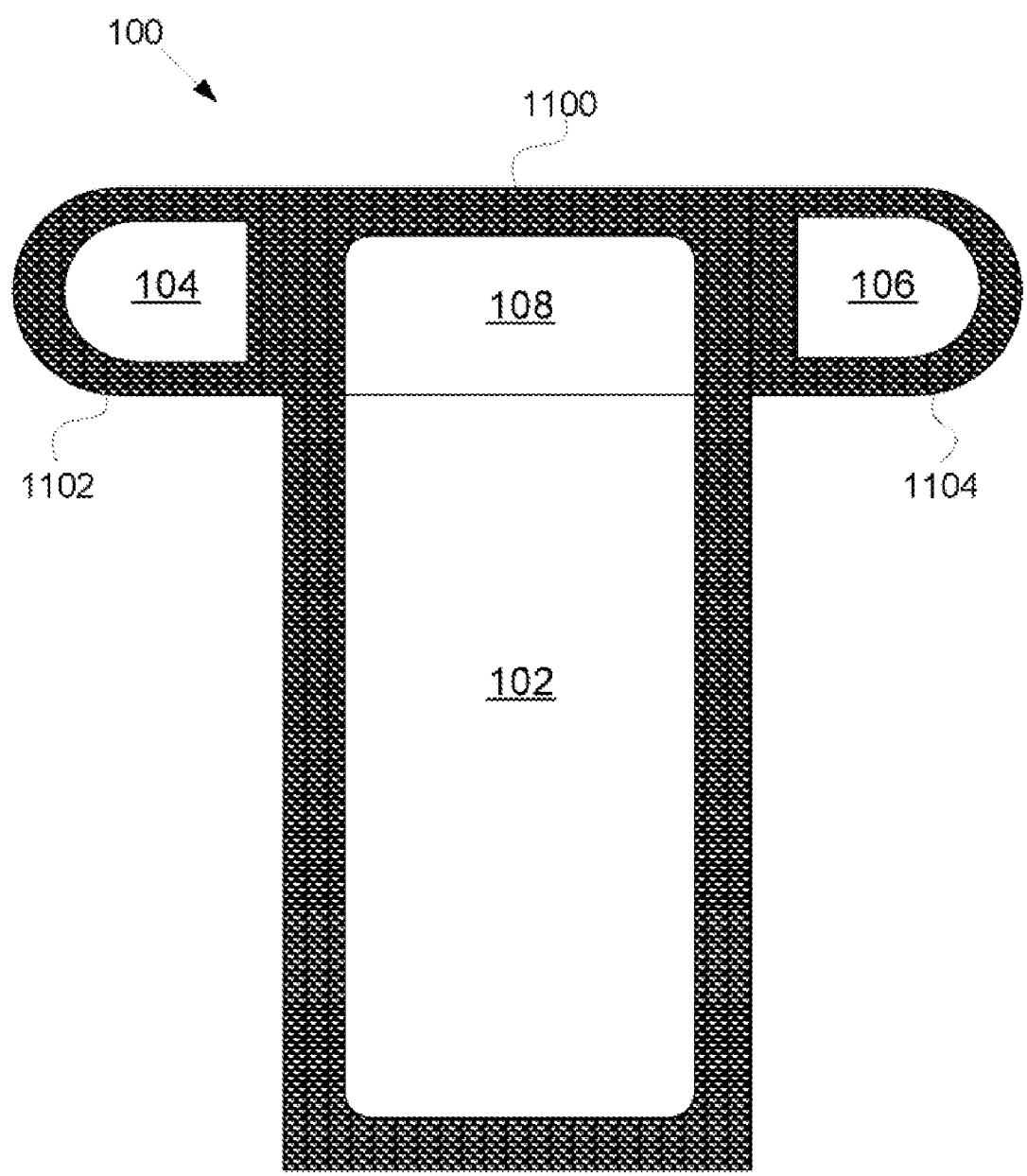
FIG. 11C illustrates a top view of a pet carrier having a bolster in accordance with an embodiment of the present invention.
Figure 11D:
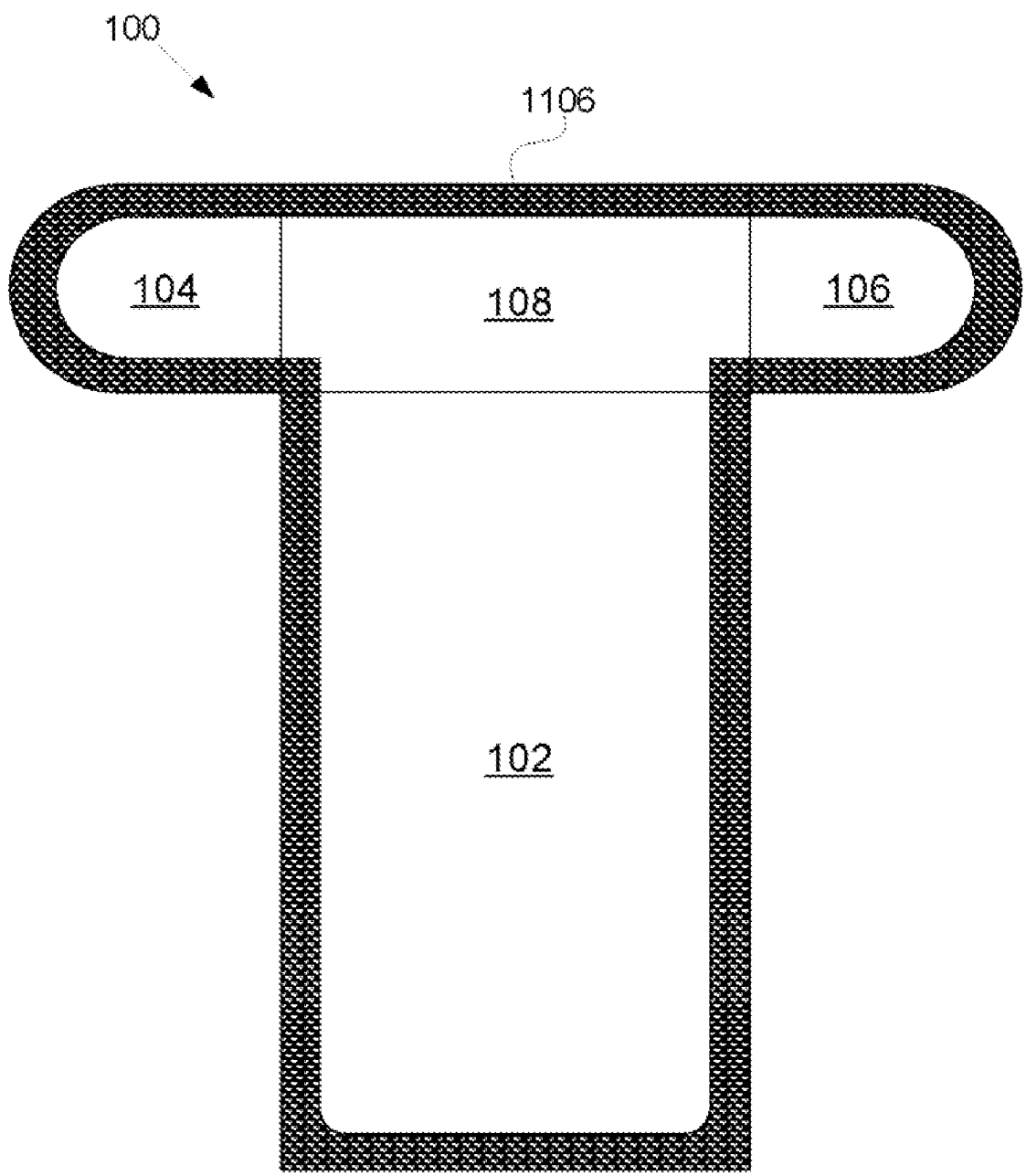
FIG. 11D illustrates a top view of a pet carrier having a bolster in accordance with an embodiment of the present invention.

In an alternative embodiment, bolsters 1102, 1104 can be positioned around the perimeter of the inner surfaces of front panel 104 and back panel 106 as shown in FIG. 11B. In this embodiment, bolsters 1102, 1104 can help define compartments where the pet's toys, food and water can be placed. In yet another embodiment, bolsters 1100, 1102, 1104 can be used in combination with each other as shown in FIG. 11C. In yet another embodiment, bolster 1106 can be positioned around the perimeter of the inner surface of the entire pet carrier 100 as shown in FIG. 11D. In other words, bolster 1106 has been positioned around a combined perimeter of top cover 102, base 108, front panel 104 and back panel 106 in the embodiment illustrated in FIG. 11D.

The following paragraphs include additional disclosures related to bolsters 1100, 1102, 1104 and 1106. Even though only bolster 1100 is described below, it is to be understood that the disclosures related to bolster 1100 can be equally applied to any of the other bolsters 1102, 1104 and 1106.

Figure 12:
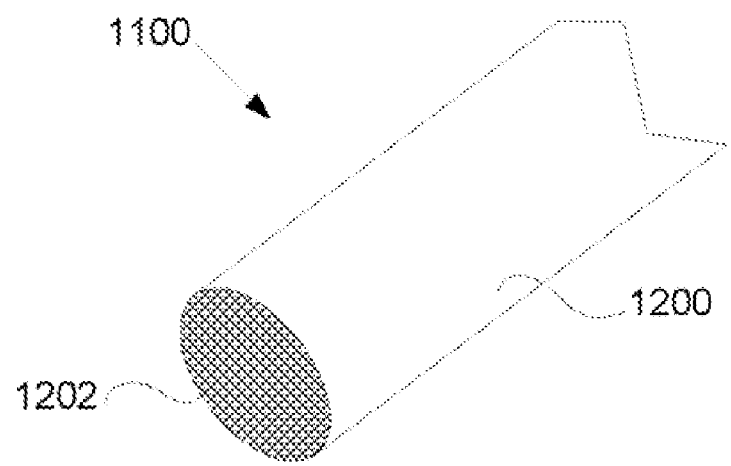
FIG. 12 illustrates a sectional view of a bolster in accordance with an embodiment of the present invention.

In an embodiment, bolster 1100 includes an outer cover 1200 filled with cushion material 1202 as generally shown in FIG. 12. In this embodiment, outer cover 1200 can be made of any soft, flexible fabric, such as, nylon, polyester, cotton and other suitable fabrics. In this embodiment, cushion material 1202 may include, but not limited to, foam, polyester, styrofoam beads, cotton, and other suitable materials.

Figure 13A:
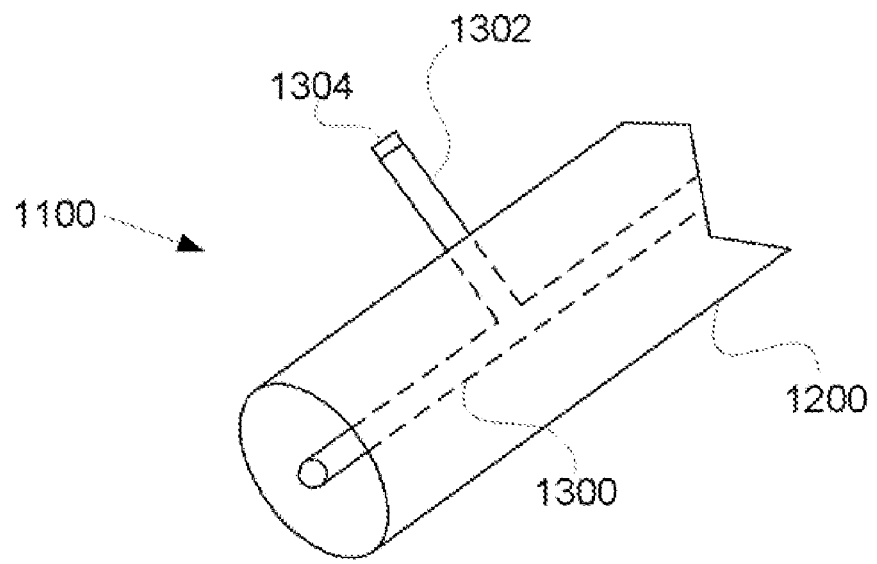
FIG. 13A illustrates a sectional view of a bolster in accordance with an embodiment of the present invention.
Figure 13B:
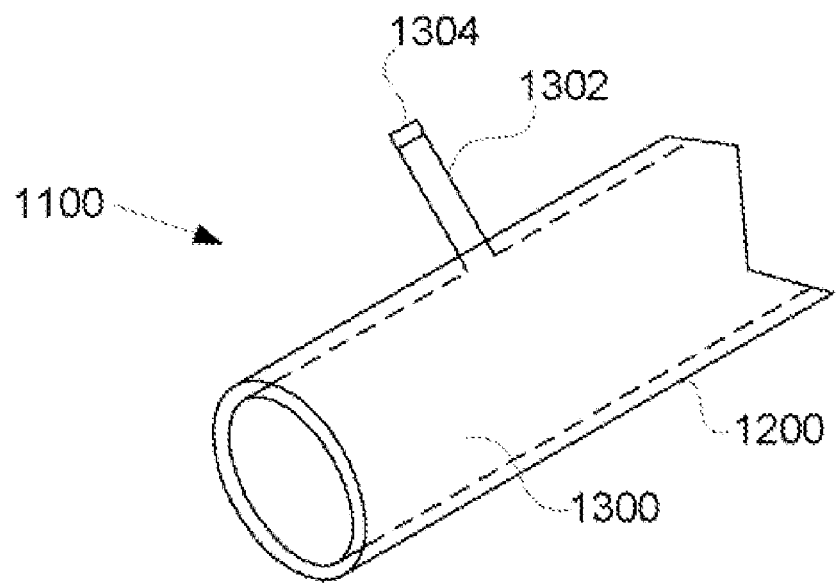
FIG. 13B illustrates a sectional view of a bolster in accordance with an embodiment of the present invention.

Referring now to FIGS. 13A and 13B, cross-sectional views of a portion of bolster 1100 is illustrated in accordance with an embodiment of the present invention. As generally shown in FIGS. 13A and 13B, outer cover 1200 of bolster 1100 surrounds inflatable tube 1300 having valve 1302. In this embodiment, valve 1302 is bonded to inflatable tube 1300 and extends through outer cover 1200. Accordingly, valve 1302 allows air to readily flow into, and out of, inflatable tube 1204. In an embodiment, air can be injected, blown, and pumped into inflatable tube 1300 through valve 1302.

FIG. 13A illustrates bolster 1100 in its deflated or collapsed state while FIG. 13B illustrates bolster 1100 in its inflated state. Once inflatable tube 1300 has been properly inflated, any suitable plug or cap 1304 can be used to close the outer opening of valve 1300 to prevent the air from escaping inflatable tube 1204. Cap 1304 can be removed from valve 1302 to let the air out of inflatable tube 104 in order to return bolster 1100 to its collapsed or deflated state.

In an embodiment, inflatable tube 1204 is preferably made of substantially non-stretchable, flexible material. In an embodiment, inflatable tube 1204 can be made of, but is not limited to, nylon, flexible polyurethane, plasticized polyvinylchloride, rubber, polyvinyl fluoride, dichlorosulfonated polyethylene and other suitable polymers.

Figure 14:
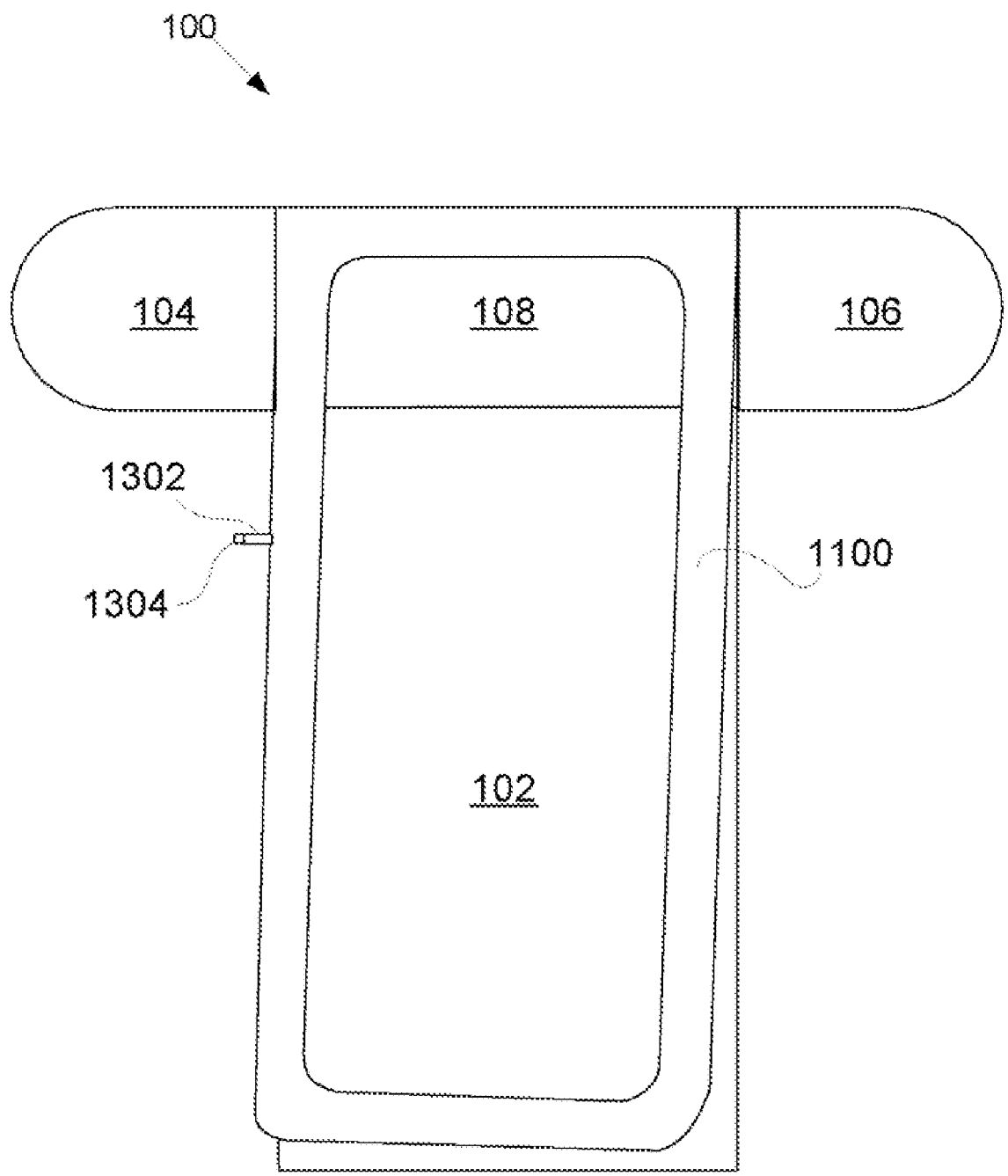
FIG. 14 illustrates a perspective view of a pet carrier having a partially detachable bolster in accordance with an embodiment of the present invention.

In an embodiment of pet carrier 100, bolster 1100 can be detachably connected to the inner surface pet carrier 100. In another embodiment, bolster 1100 can be completely detached from pet carrier 100 and stored separately. In yet another embodiment, bolster 1100 can be detached from pet carrier 100 on three of its four sides as illustrated in FIG. 14. In this configuration, bolster 1100 can be rolled up and stored within pet carrier 100 when not in use. Bolster 1100 can be attached to the one or more sides of pet carrier 100 using one or more attaching mechanisms.

Figure 13C:
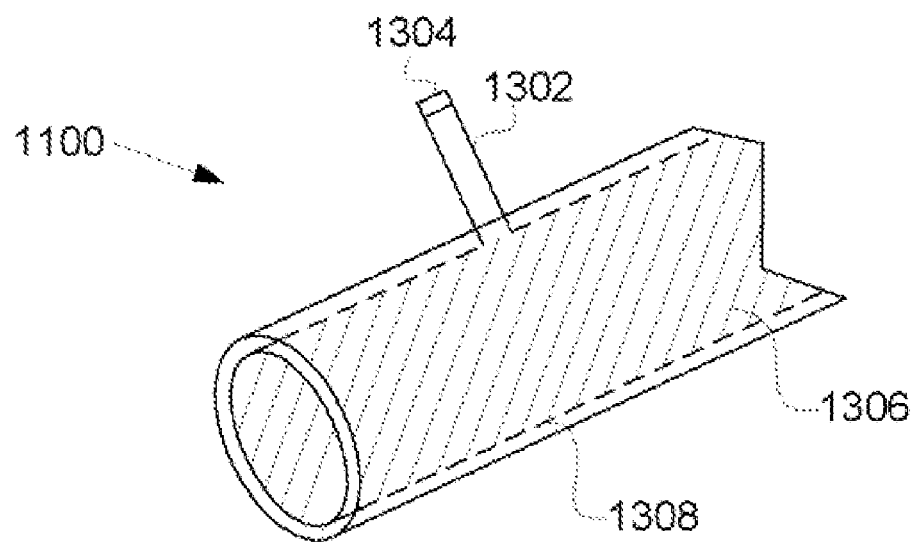
FIG. 13C illustrates a sectional view of a bolster in accordance with an embodiment of the present invention.

In an alternative embodiment, bolster 1100 can be self-inflating. Referring now to FIG. 13C, bolster 1100 includes a light weight open-celled foam material 1306. The foam material 1306 is enclosed in an air-tight, light-weight flexible cover 1308. Valve 1302 can be incorporated into flexible cover 1308 to allow air to readily flow into, and out of foam material 1306. When valve 1302 is opened and bolster 1100 is placed in its deployed configuration, bolster 1100 will suck air into the flexible cover 1308 and self inflate due to the resilience of the foam material 1306 as it returns to its original size and shape. The firmness of bolster 1100 may be increased by injecting, blowing or pumping a small amount of air into flexible cover 1308 through the valve 1302.

When not in use, bolster 1100 can be squeezed and rolled as air is allowed to escape foam material 1306 of bolster 1100 through valve 1302. Once bolster 1100 has been rolled to its undeployed configuration, cap 1304 can be placed on valve 1302 to prevent air from flowing into the bolster 1100. In an embodiment, bolster 1100 can be rolled up and attached to the base when not in use as described above with respect to FIG. 14, wherein bolster 1100 is detached from pet carrier 100 on three of its four sides.

In an embodiment, the flexible cover for the self-inflating bolster 1100 can be made of, but is not limited to, nylon, flexible polyurethane, plasticized polyvinylchloride, rubber, polyvinyl fluoride, dichlorosulfonated polyethylene and other suitable polymers. In an embodiment, the core is made of, but is not limited to, polyurethane foam, polyether foam, silicone rubbers, neoprene polymer foams, low density polyethylene foam, polyisoprene sponges, and plasticized polyvinylchloride.

Pockets

Figure 15:
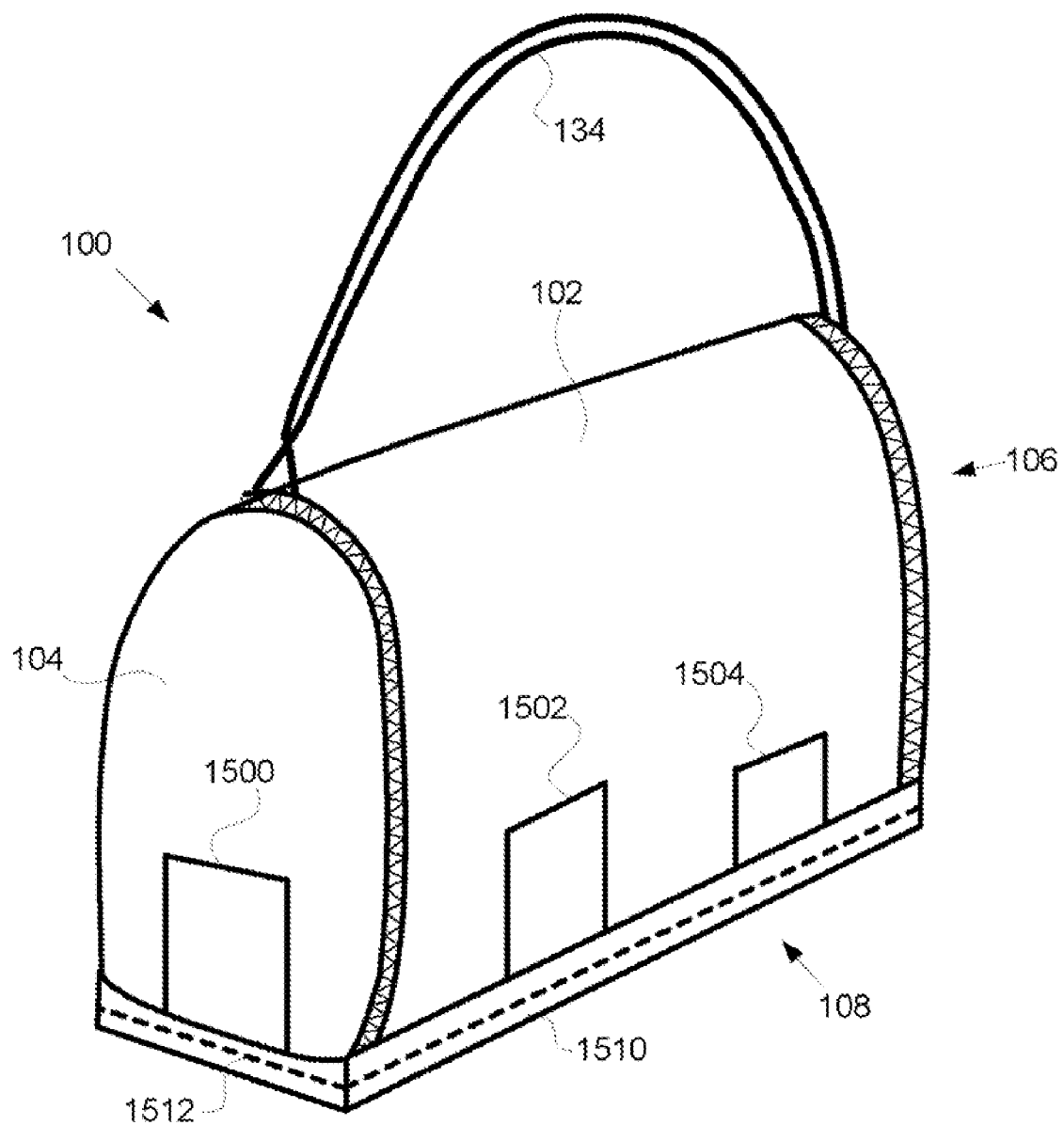
FIG. 15 illustrates a top perspective view of a pet carrier having pockets in accordance with an embodiment of the present invention.
Figure 16:
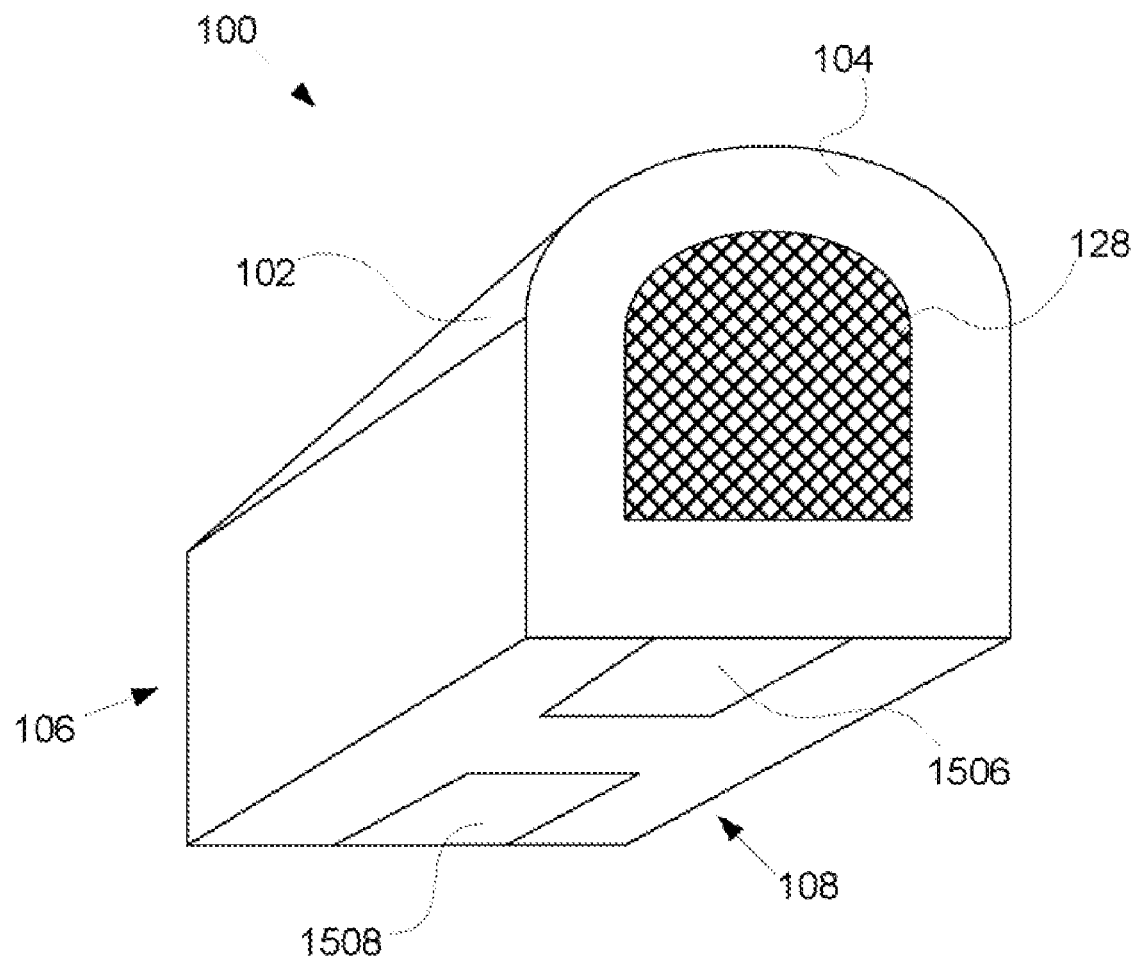
FIG. 16 illustrates a bottom perspective view of a pet carrier having pockets on its bottom surface in accordance with an embodiment of the present invention.

Embodiments of pet carrier 100 can also include one or more pockets along its exterior and interior surfaces. Referring now to FIGS. 15 and 16, pet carrier 100 can be seen as including a plurality of pockets 1500, 1502, 1504, 1506, 1508 on its exterior surfaces. In this embodiment, pockets 1500, 1502, 1504 have been positioned on the front panel and the top cover 102 proximal to base 108. In an embodiment, the exterior surface of base 108 can also have one or more pockets 1506, 1508 as shown in FIG. 16. In an embodiment, a pocket 1510 can be used, which substantially covers the entire area of base 108 as shown in FIG. 15. In this embodiment, pocket 1510 can have zipper 1512 that goes around the entire perimeter of pocket 1510.

Figure 17:
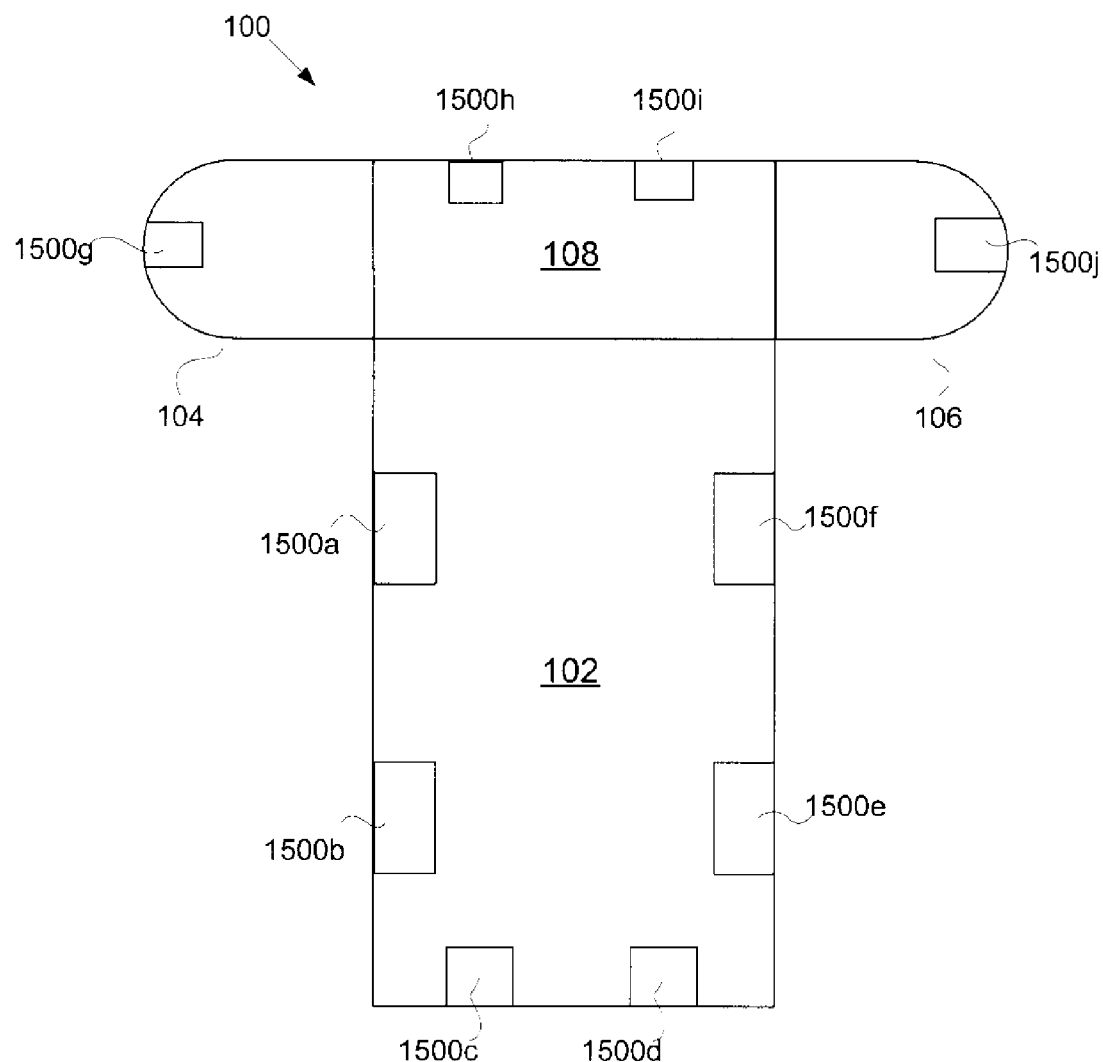
FIG. 17 illustrates a top view of a pet carrier in its fully deployed configuration having pockets in accordance with an embodiment of the present invention.

In an embodiment, one or more pockets can also be included on the interior surfaces of pet carrier 100. FIG. 17 illustrates an embodiment of the invention wherein a plurality of pockets 1512a-1512j have been incorporated into the interior surfaces of pet carrier 100. In this embodiment, a plurality of pockets 1512a-1512j have been arranged about the inner perimeter of pet carrier 100. In an embodiment, at least one pocket has an opening proximal to the center of the pet carrier. It is to be understood that any number of pockets can be positioned on any of the exterior or interior surfaces of pet carrier 100 in any arrangement or configuration as envisioned by one having ordinary skill in the art and still fall within the scope of this invention.

Figure 18A:
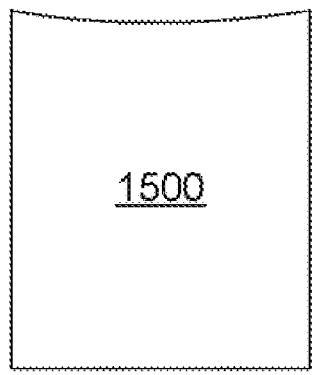
FIG. 18A illustrates a pocket for a pet carrier in accordance with an embodiment of the present invention.
Figure 18B:
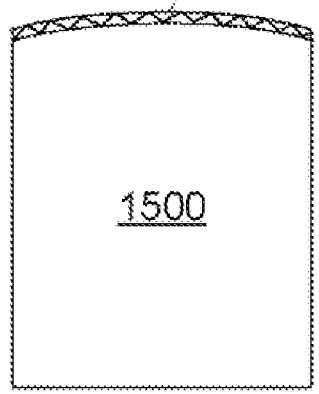
FIG. 18B illustrates a pocket for a pet carrier in accordance with an embodiment of the present invention.
Figure 18C:
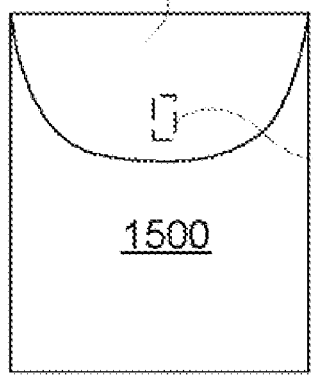
FIG. 18C illustrates a pocket for a pet carrier in accordance with an embodiment of the present invention.

In an embodiment, pockets included on pet carrier 100 can be formed by attaching three sides of an additional layer of material onto any surface of pet carrier 100. The side of the additional layer of material that is not attached to pet carrier 100 constitutes the opening of the pocket. In an embodiment, opening 1800 of pocket 1500 does not have a closing feature as show in FIG. 18A. In other words, it is an open style pocket. In other embodiments, pockets 1500 can be lined with closing features such that objects are prevented from falling out of pockets 1500. For example, FIG. 18B illustrates pocket 1500 employing a zipper 1802 along opening 1800 as its closing feature. As another example, FIG .18C illustrates pocket 1500 having a closing feature that consists of a flap 1804 that is lined with Velcro 1806. It is to be understood that other pocket designs and closing features can be used on pet carrier 100 as would be envisioned by one having ordinary skill in the art and still fall within the scope of this invention.

Although the present invention has been shown and described in detail with regard to only a few exemplary embodiments of the invention, it should be understood by those skilled in the art that it is not intended to limit the invention to the specific embodiments disclosed. Various modifications, omissions, and additions may be made to the disclosed embodiments without materially departing from the novel teachings and advantages of the invention, particularly in light of the foregoing teachings. Thus, it is intended to cover all such modifications, omissions, additions, and equivalents as may be included within the spirit and scope of the invention as defined by the following claims.

The invention claimed is:

1. A pet carrier for accommodating a pet comprising:
   a base having a front edge, a back edge, a first side edge and a second side edge;

wherein a front panel and a back panel are attached to the front edge and the back edge of the base respectively, wherein a top cover is attached to the first side edge of the base;

wherein said pet carrier includes a first deployed configuration such that:
the front panel and the back panel are attached to the top cover;
the top cover is removably attached directly to the second side edge so that a substantially enclosed space is defined, and
the base provides a support surface within the substantially enclosed space;

wherein said pet carrier includes a second configuration such that:
the front panel and the back panel are partially attached to the top cover,
the top cover is detached from the second side edge;
the base, the front panel and the back panel all extend substantially perpendicular to the top cover, and
the top cover provides a horizontal support surface for the pet; and a roof connected to the base proximal to the second side edge of the base for providing overhead shelter to the pet when the pet carrier is in the second configuration;

wherein when the top cover is removably attached with the second side edge, the roof and the top cover overlap.

2. The pet carrier of claim 1, wherein:
the roof comprises a front edge, a back edge and a first side edge; and
the roof comprises a first deployed configuration such that:
the first side edge of the roof is connected to the base proximal to the second side edge of the base;
the front edge of the roof is at least partially connected to the front panel; and
the back edge of the roof is at least partially connected to the back panel.

3. The pet carrier of claim 1, wherein the roof is permanently connected to the base, and detachably connected to the front panel and the back panel, wherein the roof can be rolled up and attached to the base using one or more attachment mechanisms.

4. The pet carrier of claim 1, wherein the roof comprises an extendable frame.

5. The pet carrier of claim 4, further comprising:
wherein the extendable frame comprises an outer frame that is connected to the base, the front panel and the back panel;
wherein the outer frame is connected to a pull-out bar and a roller on substantially opposing sides of the outer frame;
wherein the pull-out bar is slidably attached to the outer frame;
wherein material for the roof is attached to the pull-out bar and rolled around the roller; and
wherein additional roof material is exposed by pulling the pull-out bar away from the outer frame.

6. The pet carrier of claim 4, wherein the extendable frame comprises at least two sections that are folded over one another when unextended and unfolded when extended.

7. The pet carrier of claim 6, wherein the at least two sections of the roof pivot about one or more spring biased hinges.

8. A pet carrier for accommodating a pet comprising:
a base having a front edge, a back edge, a first side edge and a second side edge;
a front panel attached to the front edge;
a back panel attached to the back edge;
a top cover fixedly attached to the first side edge;
a roof attached to the second side edge and attached along a portion of the front panel and the back panel;
said pet carrier having a first configuration wherein the top cover is removably attached along a periphery of the front panel and the back panel and removably attached directly to the second side edge so that a substantially enclosed space is defined, the base providing a support surface within the substantially enclosed space;
said pet carrier having a second configuration wherein the top cover is detached from the second side edge, and partially detached from the front panel and the back panel so that an exposed space is defined within the previously substantially enclosed space, the top cover providing a horizontal support surface within the exposed space;
wherein the roof provides overhead shelter to the pet when the pet carrier is in the second configuration;
wherein when the top cover is removably attached with the second side edge, the roof and the top cover overlap.

9. The pet carrier of claim 8, wherein the roof is permanently connected to the base, and detachably connected to the front panel and the back panel, wherein the roof can be rolled up and attached to the base using one or more attachment mechanisms.

10. The pet carrier of claim 8, wherein the roof is removably attached to the second side edge and removably attached along a portion of the front panel and the back panel.

11. The pet carrier of claim 8, wherein the roof comprises an extendable frame.

12. The pet carrier of claim 11, further comprising:
wherein the extendable frame comprises an outer frame that is connected to the base, the front panel and the back panel;
wherein the outer frame is connected to a pull-out bar and a roller on substantially opposing sides of the outer frame;
wherein the pull-out bar is slidably attached to the outer frame;
wherein material for the roof is attached to the pull-out bar and rolled around the roller; and
wherein additional roof material is exposed by pulling the pull-out bar away from the outer frame.

13. The pet carrier of claim 11, wherein the extendable frame comprises at least two sections that are folded over one another when unextended and unfolded when extended.

14. The pet carrier of claim 13, wherein the at least two sections of the roof pivot about one or more spring biased hinges.

* * * * *